United States Patent
Aikawa et al.

(10) Patent No.: US 6,317,221 B1
(45) Date of Patent: Nov. 13, 2001

(54) IMAGE READING DEVICE AND METHOD

(75) Inventors: Toshiya Aikawa, Kanagawa-ken; Toru Ochiai, Chiba-ken; Yoshitaka Araki, Kanagawa-ken; Eisaku Maeda, Chiba-ken; Nobuhiro Fujinawa, Kanagawa-ken; Nobukazu Ito, Chiba-ken; Hideya Nagata, Kanagawa-ken; Hidehisa Tsuchihashi, Tokyo; Maki Suzuki, Chiba-ken; Seiichi Morimatsu, Kanagawa-ken, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/496,345

(22) Filed: Feb. 2, 2000

Related U.S. Application Data

(63) Continuation of application No. 08/505,000, filed on Jul. 21, 1995.

(30) Foreign Application Priority Data

Aug. 22, 1994 (JP) .................................................. 6-196559
Sep. 13, 1994 (JP) .................................................. 6-218491
Sep. 13, 1994 (JP) .................................................. 6-218492
Sep. 13, 1994 (JP) .................................................. 6-218493
Dec. 16, 1994 (JP) .................................................. 6-313353

(51) Int. Cl.[7] ......................... G06F 15/00; H04N 1/46; G03F 3/08
(52) U.S. Cl. ......................... 358/1.9; 358/506; 358/529
(58) Field of Search .................................. 358/487, 488, 358/468, 1.1, 1.11, 1.16, 506, 505, 509, 510, 514, 520, 529, 1.9, 1.2, 1.3; 355/40; 382/299, 312, 162

(56) References Cited

U.S. PATENT DOCUMENTS 4,274,732 * 6/1981 Thurn et al. ........................... 355/38
4,607,949 * 8/1986 Hakamada et al. ................... 355/40
4,837,635   6/1989 Santos .

(List continued on next page.)

FOREIGN PATENT DOCUMENTS

A-0 323 849 A2    7/1989  (EP) .
A-0 323 849 A3    7/1989  (EP) .
A-0 536 755 A2    4/1993  (EP) .
A-0 536 755 A3    4/1993  (EP) .
A-0 615 154 A1    9/1994  (EP) .
A-0 639 025 A1    2/1995  (EP) .
2-196043          8/1990  (JP) .

(List continued on next page.)

OTHER PUBLICATIONS

Society for Information Display (SID) –International Symposium –Digest of Technical Papers, vol. XXV, San Jose, Jun. 14–16, 1994: P.W. Wong, p. 801 or SID 94 Digest at 801.

Primary Examiner—Madeleine Nguyen
(74) Attorney, Agent, or Firm—Oliff & Berridge, PLC

(57) ABSTRACT

An image reading system prescans and/or scans a film with magnetic recording and image data to be stored in a film cartridge after the film is developed. The image reading system employs a one-dimensional CCD and is capable of recording/reading retrievable ID numbers on a magnetic recording part. A thumbnail display simultaneously displays all image and magnetic information of all frames of a film, and selected frames to be scanned can be easily identified and compared after obtaining the image data of such film through prescanning. Magnetic recording-information and image information are rapidly read during prescanning and selected frames are then scanned with more refinement as compared to the coarse scanning of the film during prescanning.

22 Claims, 24 Drawing Sheets

U.S. PATENT DOCUMENTS

| | | |
|---|---|---|
| 4,965,662 | 10/1990 | Shiota . |
| 4,974,096 | 11/1990 | Wash . |
| 4,991,004 | 2/1991 | Hayashi et al. . |
| 5,054,758 | 10/1991 | Nealon . |
| 5,106,030 | 4/1992 | Pagano et al. . |
| 5,111,229 | 5/1992 | Pagano . |
| 5,130,745 | 7/1992 | Cloutier et al. . |
| 5,237,156 | 8/1993 | Konishi et al. . |
| 5,274,418 | 12/1993 | Kazami et al. . |
| 5,295,204 | 3/1994 | Parulski . |
| 5,337,164 | 8/1994 | Yabe et al. . |
| 5,369,426 | 11/1994 | Jamzadeh . |
| 5,467,168 * | 11/1995 | Kinjo et al. ............... 355/77 |
| 5,537,229 * | 7/1996 | Brandestini et al. ......... 358/509 |
| 5,543,833 | 8/1996 | Toyoda et al. . |
| 5,579,471 * | 11/1996 | Barber et al. .............. 395/326 |
| 5,587,752 | 12/1996 | Petruchik . |
| 5,600,385 | 2/1997 | Takeshita . |
| 5,601,956 | 2/1997 | Inuiya . |
| 5,612,794 * | 3/1997 | Brandestini et al. ......... 358/505 |
| 5,633,977 | 5/1997 | Inoue et al. . |
| 5,666,578 * | 9/1997 | Oikawa et al. ............. 396/319 |
| 5,768,444 | 6/1998 | Nishimura . |
| 5,786,582 * | 7/1998 | Roustaei et al. ............ 235/462 |

FOREIGN PATENT DOCUMENTS

| | | |
|---|---|---|
| 03-21171 | 1/1991 | (JP) . |
| 3-178527 | 8/1991 | (JP) . |
| 3-186639 | 8/1991 | (JP) . |
| 3-190127 | 8/1991 | (JP) . |
| 3-195493 | 8/1991 | (JP) . |
| 5-75922 | 3/1993 | (JP) . |
| 07-038710 | 2/1995 | (JP) . |
| WO-A-90 04302 | 4/1990 | (WO) . |
| WO-A-91 04510 | 4/1991 | (WO) . |
| 92/05469 | 4/1992 | (WO) . |

* cited by examiner

FIG.13A

| NO. 1 | NO. 2 | NO. 3 | NO. 4 |
|---|---|---|---|
| NOV. 22.94 15:12 | NOV. 22.94 15:15 | NOV. 22.94 20:01 | NOV. 22.94 20:05 |

| NO. 7 | NO. 8 | NO. 10 | NO. 12 |
|---|---|---|---|
| DEC. 08.94 125 12:03 | FEB. 12.95 13:29 | FEB. 12.95 14:29 | MAY. 04.95 09:43 |

| NO. 6 | NO. 11 | NO. 5 | NO. 9 |
|---|---|---|---|
| DEC. 08.94 08:27 | FEB. 12.95 14:31 | NOV. 22.94 20:17 | FEB. 12.95 13:40 |

FIG.13B

| NO. 1 | NO. 2 | NO. 3 | NO. 4 | NO. 5 | NO. 6 |
|---|---|---|---|---|---|
| TOKYO DEC. 06.94 | TOKYO DEC. 06.94 | TOKYO DEC. 06.94 | TOKYO DEC. 06.94 | TOKYO DEC. 07.94 | TOKYO DEC. 07.94 |

| NO. 7 | NO. 8 | NO. 9 | NO. 10 | NO. 11 | NO. 12 |
|---|---|---|---|---|---|
| USAKA DEC. 25.94 | USAKA DEC. 25.94 | USAKA DEC. 25.94 | USAKA DEC. 25.94 | TOKYO DEC. 31.94 | TOKYO DEC. 31.94 |

| NO. 13 | NO. 14 | NO. 15 | NO. 16 | NO. 17 | NO. 18 |
|---|---|---|---|---|---|
| HAWAII MAR. 01.95 | HAWAII MAR. 01.95 | HAWAII MAR. 01.95 | HAWAII MAR. 01.95 | HAWAII MAR. 02.95 | HAWAII MAR. 02.95 |

| NO. 19 | NO. 20 | NO. 21 | NO. 22 | NO. 23 | NO. 24 |
|---|---|---|---|---|---|
| HAWAII MAR. 03.95 | HAWAII MAR. 03.95 | HAWAII MAR. 03.95 | NARITA MAY. 13.95 | NARITA MAY. 13.95 | NARITA MAY. 13.95 |

IMAGE READING DEVICE AND METHOD

This is a Continuation of Application Ser. No. 08/505,000 filed Jul. 21, 1995. The entire disclosure of the prior applications is hereby incorporated by reference herein in its entirety.

BACKGROUND OF THE INVENTION

1. Field of the Invention

The present invention relates to an image reading device and method. In particular, the present invention relates to an image input device that illuminates a transparent original image, photoelectrically converts the image light sensed by a one-dimensional CCD into image signals, converts the image signals into digital signals after executing various processes on the image signals, and outputs digital signals on a (personal) computer and output equipment.

2. Description of Related Art

Concerning film for use in a camera, film having a magnetic layer is proposed by Japanese Unexamined Patent Publication Hei 5-75922.

As described in FIG. 2, such film, regardless of whether the film is unexposed or already developed, is stored in a film cartridge 51 as continuous film. Perforations 53 are provided along the top edge of the film 52. An exposure section 55, etc., is provided in the central section of the film 52. A magnetic recording section 54 is provided along the bottom edge of the film 52. An aperture unit 51a and a spool 51b are formed in the film cartridge 51. In addition, Japanese Unexamined Patent Publication Hei 5-75922 proposes a video monitor retrieval unit to read the film image within the film cartridge 51 with a two-dimensional CCD sensor.

The image reading system is capable of outputting an image obtained by prescanning on a computer monitor. However, when images are read into a personal computer or the like using the above-described technology, it is impossible to see more than one frame at a time of the images, and only the magnetic recording information from one frame at a time can be viewed. Consequently, when a user wants to look up a plurality of information items, it is necessary to operate the device as many times as are frames in the spool of film, which is troublesome. Consequently, this is inconvenient when the aim is to compare a plurality of images and information because it is impossible to see the information on the magnetic recording medium simultaneously when there are a plurality of images.

In addition, it is not currently possible with prior art devices for the user to append an identification (ID) number to each film. Consequently, management of the film by the user was, heretofore, difficult.

Moreover, the video monitor retrieval unit disclosed by Japanese Unexamined Patent Publication Hei 5-75922 only outputs film images as video signals. In other words, the image is displayed on the monitor (CRT) one frame at a time. Thus, in the case when shooting images equivalent to twelve frames are in the film cartridge 51, the retrieval unit displays one frame at a time on the entire monitor screen. Therefore, if the operator of the camera desires to see a certain frame after verifying all twelve frames on the monitor, the operator has to remember the number of the desired frame from among the twelve frames.

The video monitor disclosed in Japanese Unexamined Patent Publication Hei 5-75922 uses a two-dimensional CCD sensor. Two-dimensional CCD sensors with a large number of pixels are expensive, and the distance between the photoelectric conversion elements which comprise the two-dimensional CCD sensor is uneven due to problems in construction and the like. Moreover, the sensors with a small number of pixels are relatively inexpensive, but they are only capable of reading originals coarsely, resulting in a deterioration of image quality (such as low resolution). Hence, inexpensive but highly precise reading of film images is urgently needed.

SUMMARY OF THE INVENTION

An object of the present invention is to provide a device that can handle information from a plurality of images recorded on a magnetic recording layer. In addition, it is another object of the present invention to provide a device capable of recording ID numbers on the film.

Another object of the present invention, therefore, is to provide an image input device capable of reading film with a magnetic recording layer using a one-dimensional CCD sensor.

Yet another object of the present invention is to provide an image reading system capable of displaying images of a plurality of frames on a monitor, thus enabling the operator to verify the desired frame in the case when the shooting images of a plurality of frames are in the film cartridge 51.

It is still another object of the present invention to provide a picture image reading device that can read film having a magnetic recording layer using a one-dimensional CCD sensor. In particular, it is an object of the present invention to increase the speed of pre-scan processes in this device.

According to a first aspect of the present invention, there is provided photoelectric conversion device that photoelectrically converts images photographed on film having a magnetic recording part that outputs an electrical image signal; a retrieval device that retrieves information recorded on the magnetic recording unit, and outputs a retrieval signal; a display; and a controller that outputs an image signal to the display causing a thumbnail display of a plurality of images on the display and outputs a retrieval signal to the display causing the display of display information relating to the retrieval signal.

In addition, the image reading device may comprise an image reading device capable of handling film with a magnetic recording part, the device having a recording device that records recognition information of film on the magnetic recording part.

The image reading device may further cause the controller to display the thumbnail display of a plurality of images on the display by outputting image signals to the display and causing the display of display information relating to the retrieval signal on the display by outputting retrieval signals to the display. Consequently, when images are read into a personal computer or the like, it is possible for the user to see simultaneously the thumbnail display and information about a plurality of images that are on the magnetic recording layer.

In addition, the image reading device may comprise a recording device that records recognition information of film on the magnetic recording part, and consequently, the user can easily manage the film.

According to a second aspect of the invention, there is provided a mounting unit to mount a cartridge; an extractor mechanism to remove the film from the cartridge mounted on the mounting unit; an illumination device to illuminate the film removed from the extractor mechanism; a condenser lens to gather the image of the film illuminated by the illumination device; a one-dimensional photoelectric converter to convert the image gathered by the condenser lens into electrical signals; a transport mechanism to transport the film removed from the extractor mechanism; and a transport controller to control the transport mechanism so that the film stops at each line of the photoelectric converter. This structure enables reading of film images even inside such a cartridge using a one-dimensional light source converter.

The image reading device may also enable reading of magnetic recording data if the film comprises a magnetic recording layer.

The image reading device may also obtain image signals with one path if the light emitting device comprises an RGB three color light emitting source, since RGB lights are emitted for each line.

The image reading device may also enable reading of an original since transporting of film is stopped at each line during transporting of film in the first direction, and unnecessary transport time during transporting of the film in the second direction is shortened since the film is transported with a uniform velocity.

The image reading device may also enable reading of magnetic data, especially during rewinding of the original because the magnetic data are read during transporting of the film in the second direction, which is the opposite direction from the first direction.

The image reading device may also shorten reading time because the original is transported in such a manner that a section without image data (unexposed section) is transported with a uniform velocity without stopping the original at each line.

In accordance with another aspect of the present invention, the image reading system is provided with an image output circuit to output the image data after receiving light passing through the image on a film; a retrieval circuit to retrieve the magnetic data in a magnetic recording unit; a first memory circuit to store the image data on a plurality of frames, the amount equivalent to the plurality of image frames, output from the image output circuit during prescanning; a second memory circuit to store the magnetic data, the amount equivalent to the plurality of image frames, retrieved by the retrieve circuit during prescanning; and an image processing circuit to process the image data on the plurality of frames stored in the first memory circuit and to display the image data on the monitor based on the magnetic data stored in the second memory circuit.

Since the image data of the plurality of frames obtained through prescanning are displayed based on the magnetic record information, the operator can easily specify the frame from among the plurality of frames to be scanned.

In accordance with yet another aspect of the invention, the image reading system of the present invention includes a photoelectric converter that photoelectrically converts images and outputs electrical image signals; a feeding device that feeds the film having a frame number recorded in a magnetic recording part; a detector that detects the frames of the film; a frame designating operation unit that, when operated, designates at least one of the frames of the film, and outputs a frame designation signal; and a controller that, when a frame having the frame number corresponding to the frame designation signal is detected, controls the feeding device so that the film is fed as far as a position where the photoelectric converter can read the film and controls the photoelectric converter so that the image on the designated frame is photoelectrically converted.

Feeding of the film is controlled on the basis of the detection of frame numbers recorded on the film, the detection being effected by the detector. Consequently, it is possible to feed the film accurately to a designated frame and read the image thereon.

Film having in one area a magnetic recording section has been proposed. With regard to this film, it is necessary to read the image information and the magnetic recording information. In order to read the magnetic recording information, it is necessary for the film to be conveyed at a constant speed. On the other hand, in order to read the image information with precision, it is necessary to halt conveying the film after each line has been conveyed, and to read the RGB signals while intermittently feeding the film.

However, during prescanning, it is not necessarily required to read the image information with high precision if the general contents of the image information and the contents of the magnetic recording information can be verified.

Therefore, it is possible to read the image information and the magnetic recording information while conveying the film at a constant speed.

These and other aspects and advantages of the present invention are described in or apparent from the following detailed description of preferred embodiments.

BRIEF DESCRIPTION OF THE DRAWINGS

Preferred embodiments are described with reference to the drawings, in which:

FIGS. 13A and 13B are block diagrams illustrating thumbnail displays during prescanning;

DETAILED DESCRIPTION OF PREFERRED EMBODIMENTS

Figure 1:
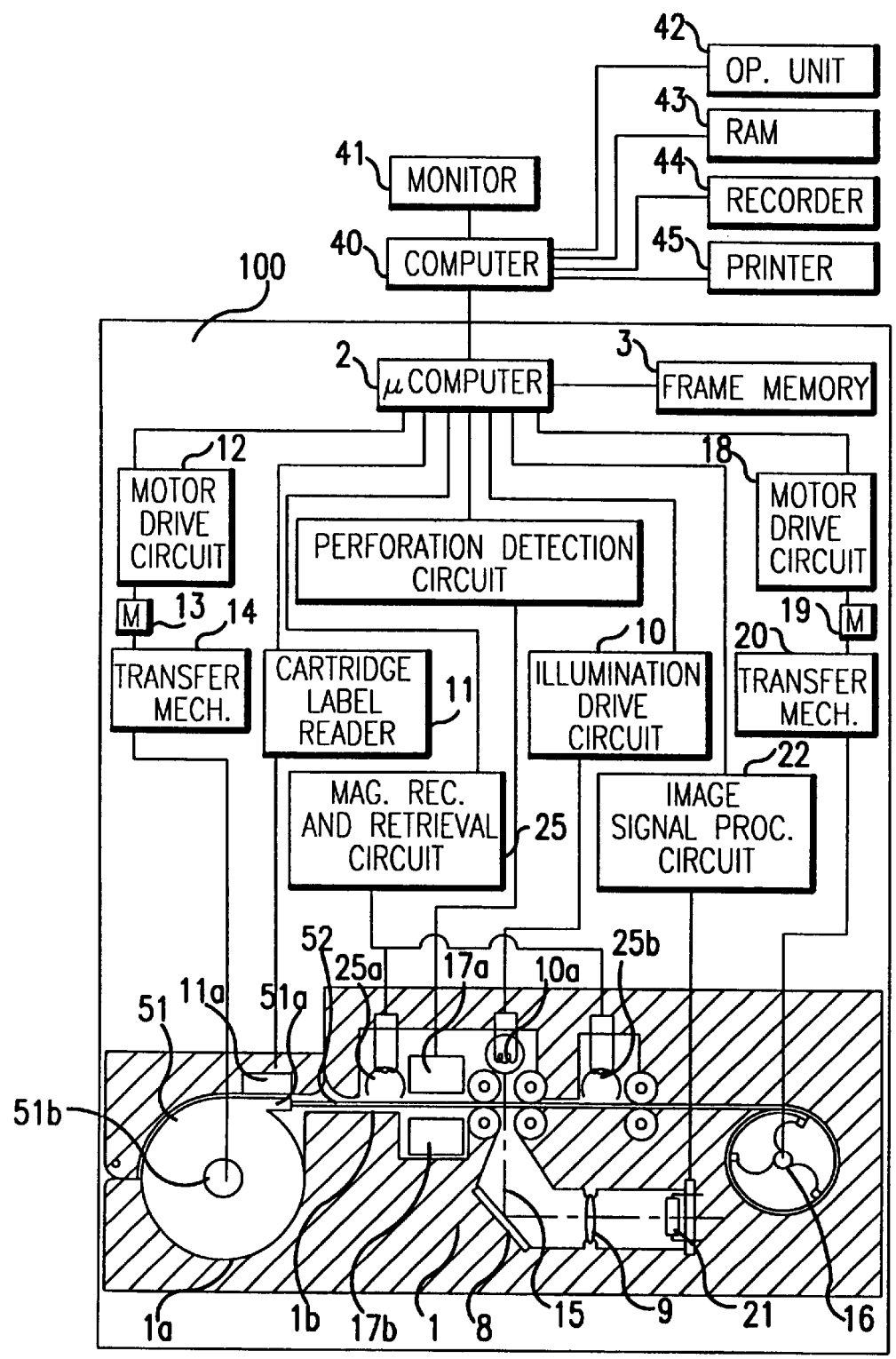
FIG. 1 is a block diagram showing the system configuration of an embodiment of the present invention.

FIG. 1 illustrates the system of the present invention. A scanner 100 is connected to an external computer 40. The system also includes a monitor 41 to display the film images; an operation unit 42, including a keyboard and a mouse; a memory device 43 such as a RAM; a recording device 44 such as a hard disk drive, floppy disk drive, or an optical magnetic disk drive; and a printer 45, which are connected to the computer 40.

Monitor 41 performs displays upon receiving commands from computer 40. Operation unit 42 is an input device such as a keyboard, a mouse or the like. Recording device 44 such as a hard disk drive or the like records data. A floppy disk drive, an optomagnetic disc drive or the like may also be used for recording device 44. A floppy disk drive and an optomagnetic disc drive record information on recording media such as floppy disks or optomagnetic discs.

Cartridge loading chamber 1a of scanner 100 is adapted to receive a cartridge 51 of film 52 having a magnetic recording layer, as disclosed in Japanese Unexamined Patent Publication Hei 5-75922.

Figure 2:
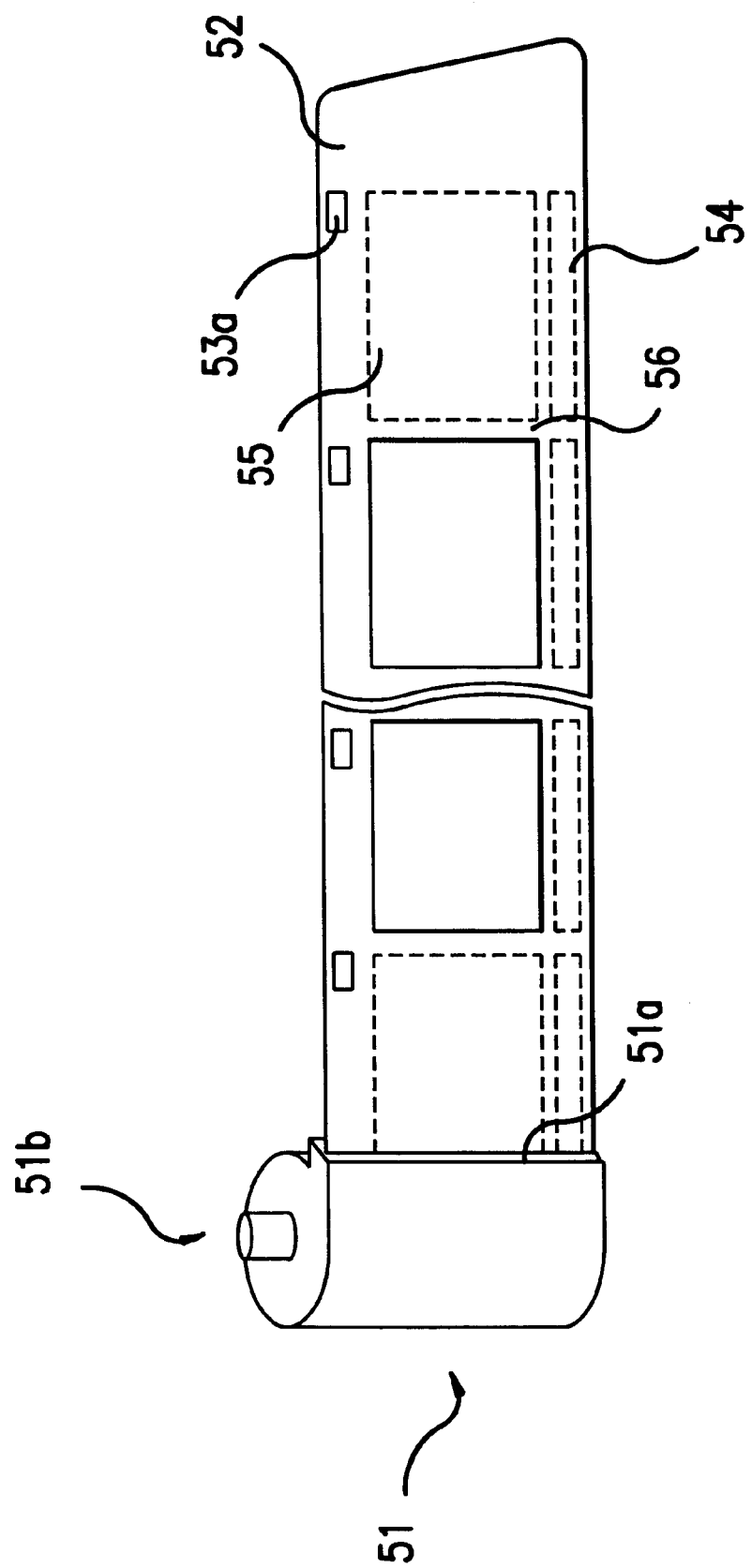
FIG. 2 is a drawing showing the film that can be loaded in the device according to an embodiment of the present invention.

FIG. 2 will be used to describe film 52 having a magnetic recording layer.

Film 52 can be housed inside film cartridge 51, on one end of which is attached spool 51a. On the film 52, a single perforation 53 and a magnetic recording part 54 are provided for each photo frame.

In addition, a "0" frame region, which cannot be photographed onto, is provided prior to the first photo frame. In the "0" frame region, perforation 53a and magnetic recording part 54a are provided.

In addition, on film. cartridge 51, information indicating whether film 52 has been developed and information indicating the type of film are displayed by an optically readable label. The information indicating the type of film includes information as to whether the film is negative or positive, information about whether the film is color or black and white film, and information indicating the film manufacturer and model number.

The following data are also recorded in the magnetic recording unit 54 for each frame as shooting takes place.

Zoom data if a zoom lens is mounted, F-number data and shutter speed data obtained from the AE (auto exposure) sensor and the shutter speed setting dial, data concerning light emission from the strobe, the exposure correction value set by the exposure correction dial, and the shooting date or shooting time are stored.

Next, the configuration of scanner 100 will be described with reference to FIG. 1.

Microcomputer 2 controls the various devices within scanner 100 upon receiving commands from computer 40.

Illumination member 10a is a device used to illuminate film 52. Illumination drive circuit 10 is controlled by a microcomputer 2 in order to drive illumination member 10a. Light emitted from illumination member 10a is reflected by mirror 8, collected by lens 9 and reaches linear image sensor 21, as indicated by optical axis 15. Linear image sensor 21 is a unit used to convert film images into electrical image signals. Image signal processing circuit 22 is used to digitize the image signal that is read. In addition, when the image signal received is a signal from a negative film, image signal processing circuit 22 converts the signal into a positive image signal. Frame memory 3 is used to record image signals output from image signal processing circuit 22.

The lens 9 is a variable power focus lens or a fixed focus lens. If the lens 9 is a variable power focus lens, the reading range of the film 52 is magnified or reduced by variable power orders from the computer 40. If the lens 9 is a fixed focus lens, magnification and reduction are executed by processing the image data within the computer 40.

Incidentally, there are three methods for obtaining color image signals. First, the illumination unit 10a can have three different colors of light source and can form image signals of red, green and blue (RGB) by irradiating each of the RGB colors. The second method is to provide filters with RGB colors between the illumination unit 10a and a one-dimensional CCD sensor 21 and to form RGB image signals by changing the color filters. The third method is to provide a color CCD as a one-dimensional CCD sensor 21 to form RGB image signals.

Magnetic heads 25a and 25b are used to read information recorded on the magnetic recording layer of film 52 and are also used to write information onto the magnetic recording layer of film 52, which is described later.

Developed film detector 11a is an optical reading sensor. Developed film detector 11a detects information indicating whether film 52 has been developed, as well as the name of the manufacturer and whether the film is color or black and white and the model number of film 52, by reading the above-described optically readable label on film cartridge 51. Developed film detection circuit 11 is controlled by microcomputer 2 to drive developed film detector 11a.

The perforation detection units 17a and 17b can be made to detect a perforation 53 optically or to detect a perforation 53 by sending current through a perforation 53 section using a contact type electric connector. Perforation detectors 17a and 17b are sensors that detect optical perforations 53. Perforation detection circuit 17 is controlled by microcomputer 2 to drive perforation detectors 17a and 17b.

A motor driving circuit 12 drives a motor 113. The driving power generated by the motor 13 is transmitted to a spool 51b through a transmission mechanism 14 including a gear train. Thus, forwarding or rewinding of the film 52 is enabled by controlling the direction and the speed of the motor 13. Upon rotation of the motor 13, the motor driving circuit 12 rotates a pair of rollers 31. The pair of rollers 31 is placed on the entrance side of the film reading frame.

The motor driving circuit 18 drives the motor 19. The driving power generated by the motor 19 is transmitted to the rewinding-side spool 16 through a transmission mechanism 21 including a gear train. Thus, by controlling the direction and the speed of the rotation of the motor 19, advancing and rewinding of the film 52 are enabled. Upon rotation of the motor 19, the motor driving circuit 18 rotates a pair of rollers 32 and 33. The pair of rollers 32 and 33 is placed on the entrance side of the film reading frame. Once the film is set, the motor driving circuit 12 and the motor driving circuit 18 are synchronized and controlled by the microcomputer 2. In other words, if the spool 51b rotates clockwise, the rewinding-side spool 16 also rotates clockwise. However, it is not necessary that the rotations of the spool 51*b* and the rewinding-side spool 16 have the same speed. The rotation of the rewinding-side spool 16 can be made a little faster than the rotation of the spool 51*b*. By this means, tension can be given to the film, thus preventing curling of the film. Moreover, because a pair of rollers 31–33 is provided at the entrance and the exit of the film reading frame, flatness of the film is assured and feeding of the film for each line is enabled.

Incidentally, the rewinding-side spool 16 is shaped such that the tip of the film is wound easily, and a convex hook (not shown) that engages the perforation 53 is formed on the spool axis.

In the following illustrated preferred embodiments, the microcomputer 2 can be implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the microcomputer 2 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The microcomputer 2 can also be implemented using a suitably programmed general purpose computer, e.g., a microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in the following figures can be used as the microcomputer 2. As shown, a distributed architecture is preferred for maximum data/signal processing capability and speed.

Next, the operation of the device of an embodiment of the present invention will be described. The mode that produces a thumbnail display of all the frames of a film 52 simultaneously on the monitor 41 will be described with reference to the flowcharts in FIGS. 3 and 4. A thumbnail display is a small-size display of the images on the monitor 41.

Figure 3:
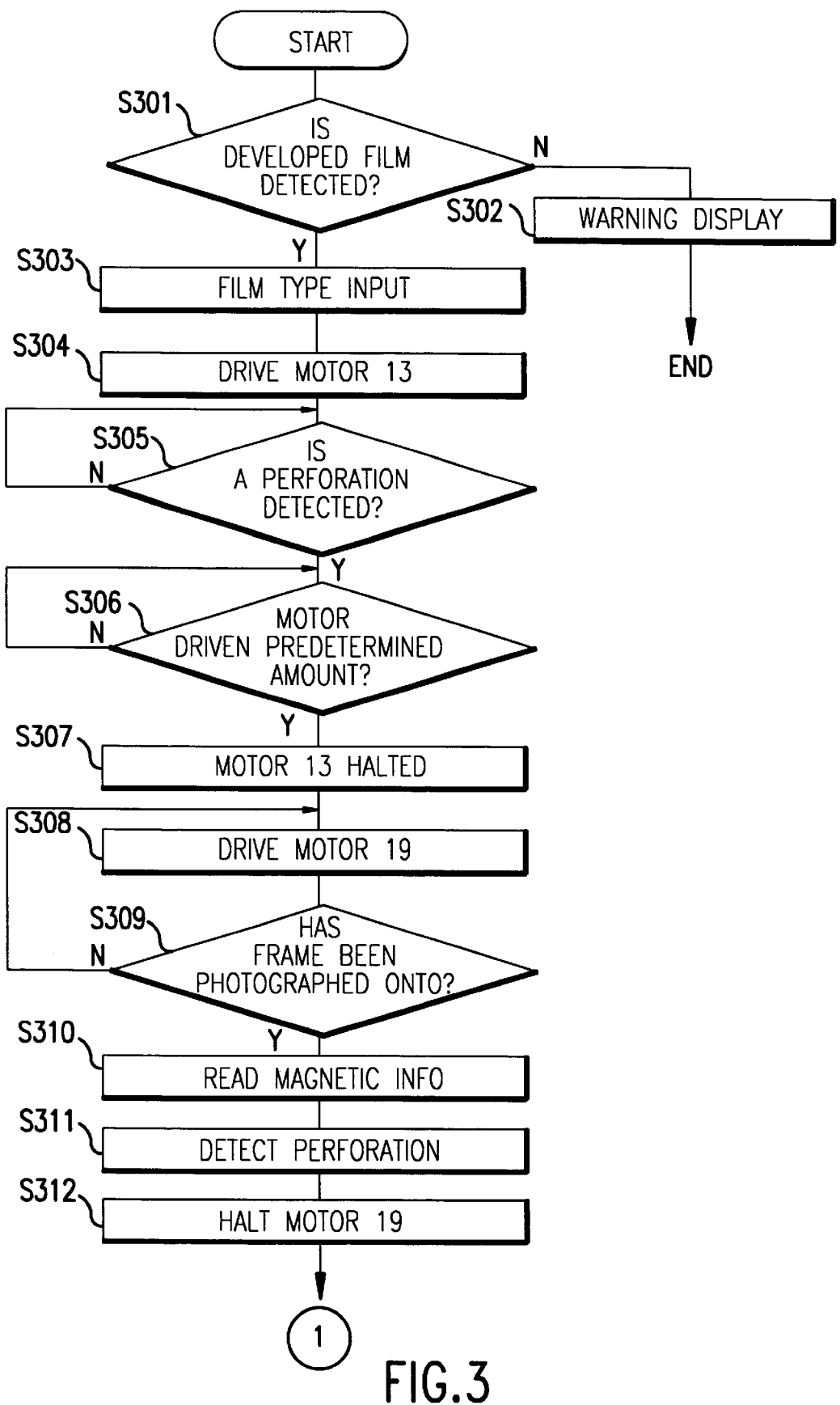
FIG. 3 is a flowchart illustrating a control of the device according to an embodiment of the present invention.

The user selects the all-frame thumbnail display from a menu displayed on monitor 41, the selection being made using operation unit 42. The ID number of the film cartridge is input. The ID number is input in whatever combination of English characters, Chinese characters and numbers or the like that the user finds desirable. When this occurs, the computer 40 commands of the microcomputer 2 an all-frame thumbnail display. At this time, the flowchart in FIG. 3 is started.

In step S301, the determination is made, on the basis of detection performed by developed film detector 11*a*, as to whether developed film cartridge 51 has been loaded in cartridge loading chamber 1*a*. When this determination is NO, the microcomputer 2 moves to step S302 and warns computer 40 if film cartridge 51 has not been loaded or if film 52 is undeveloped. Computer 40 performs a warning display on monitor 41 in accordance with the warning received. It would also be acceptable to provide a display device on scanner 100 and to perform the warning on the display device. By determining whether a developed film cartridge is loaded, it is possible to prevent undeveloped film from being extracted from cartridge 51 erroneously.

When the determination in step S301 is YES, the microcomputer moves to step S303. In step S303, the film type of film 52 is detected by developed film detector 11*a*.

Next, in step S304, a drive signal is output to the motor drive circuit 12, and the motor 13 is driven. The drive power of motor 13 is transferred to spool 51*b* via transfer mechanism 14. Furthermore, the tip of film 52 is fed out from film exit opening 51*a* in the body of the cartridge. Next, in step S305, the microcomputer waits for perforation detector 17 to detect perforation 53*a* of the "0" frame. When perforation 53*a* is detected in step S305, motor 13 is driven by a specific amount in step S306, and motor 13 is then halted in step S307. When motor 13 is halted, motor 13 has been driven by a specific amount in step S306 so that film 52 reaches winding-side spool 16. Next, in step S308, a drive signal is output to motor drive circuit 18, and motor 19 is driven in the direction of winding. At this time, the connection between motor 13 and spool 51*b* is broken by transfer mechanism 14.

Next, in step S309, magnetic head 25*a* reads the data in magnetic recording part 54, and the determination is made as to whether that frame has been photographed onto. When the determination in step S309 is NO, the microcomputer returns to step S308 and continues driving motor 19. Through this, useless frames are fast-forwarded, thereby allowing the time needed for generating the thumbnail display to be reduced.

When the determination in step S309 is YES, the microcomputer moves to step S310. In step S310, magnetic head 25*a* reads the recorded information in magnetic recording part 54, and the recorded information is output to computer 40. Computer 40 sends the recorded information that has been received to recording device 44 and records this information on a recording medium. The recorded information read at this time includes the frame number, the date and time of photography, image direction information, photograph size information and color temperature information. The image direction information indicates whether the image is a vertical position photograph or a horizontal position photograph. The photograph size information indicates what size the photographed image is, such as normal size, panorama size, hi-vision size or half size, and also indicates those portions of the photograph image that can be trimmed.

Next, when perforation detector 17*a* detects perforation 53 in step S311, a halt signal is output to motor drive circuit 18 in step S312. Accordingly, driving of motor 19 is halted, and feeding of the film is also halted. At this time, the tip of the film image is positioned on optical axis 15.

Next, in step S413 (FIG. 4), a drive signal is output to motor drive circuit 18, and film 52 is fed at a constant speed. The feeding speed at this time is set as a faster value than during scanning. Linear image sensor 21 is driven in step S414 and quickly prescans the image, which undergoes image processing in image signal processing circuit 22. The processed image signal is stored in frame memory 3. Because the image is only prescanned at a fast speed, the image can be accepted in a much shorter time than during scanning because less memory storage is required for prescanning.

Then, the operations in steps S413 and S414 are repeated until it is verified in step S415 that the acceptance of the image in one frame has been completed.

When the determination in step S415 is YES, the microcomputer moves to step S416 and outputs the image signal from frame memory 3 to computer 40. In addition, besides the image signal, the maximum signal level for each color RGB within the photo frame, the minimum signal level, and a histogram of the signal levels is output in step S416.

Computer 40 responds to the input of the image signal by displaying a thumbnail display of the image on monitor 41. Computer 40 displays thumbnail images in a row on monitor 41 each time an image signal is input from scanner 100. When each display is made, recorded information such as the frame number and the like is displayed below the thumbnail displays, the information having been read from the magnetic recording layer.

The display on monitor 26 may be either a large display on the screen of each frame instead of a thumbnail display, or a display in which the display is initially large and then reduced in size to be a thumbnail display, or a thumbnail display of all images at once after all frames have been accepted. Or, the display can switch vertical and horizontal in the case of vertical position photography as determined by information read from the magnetic recording layer. In addition, the display can trim the film images to only the necessary portions on the basis of the photography size information.

In addition, computer 40 outputs to recording device 44 the recorded information that has been sent and records this information on the recording medium. The image signal is the roughly read data, and it is possible to record this at high speed because the amount of data is small.

Next, in step S417, the magnetic recording and retrieval circuit is driven, and magnetic head 25b records on magnetic recording part 54 the fact that the thumbnail display has been completed.

Next, in step S418, the determination is made as to whether the frame for which acceptance has been completed is the final frame of film 52. When the determination in step S418 is YES, the microcomputer moves to step S419. When the determination in S418 is NO, the microcomputer returns to step S413 and repeats the above-described processes.

Because motor driving in step S308 is set at a faster speed than motor driving in step S413, shortening of the time interval needed for reading thumbnail displays is achieved.

In step S419, the connection between motor 19 and winding side spool 16 is broken by transfer mechanism 20. Next, the connection between motor 13 and spool 51b is made by transfer mechanism 14. Furthermore, a halt signal is output to motor drive circuit 18, so that motor 19 is halted. Then, a drive signal is output to motor drive circuit 12, and motor 13 is driven in the direction of rewinding film 52. Driving of motor 13 is continued until perforation 53b of the first frame is detected in step S420.

When perforation 53b of the first frame is detected in step S420, the microcomputer moves to step S421. In step S421, a signal is output to motor drive circuit 12, causing motor 13 to decelerate. Next, in step S422, magnetic head 25a is controlled so that the above-described ID number is recorded on magnetic recording part 54a of frame "0."

By recording the ID number, the user can determine that thumbnail acceptance has been accomplished, by reading the ID number.

Consequently, even if cartridge 51 is once removed, if the ID number can be read, it is possible to conduct scanning under suitable conditions on the basis of data recorded at the time of thumbnail acceptance. In addition, by appending an ID number, management of the film by the user becomes easier. For example, it becomes possible to manage the ID numbers using database software or the like. In addition, if a photo retouch software has a function that enables operation by interlocking with the ID number, it is possible to create an image with the same adjustments at any time without complicated and troublesome operations.

In steps S310 and S416, the output destination of information was computer 40, but this may also be connected to a transmission device.

In addition, in the above-described embodiment, the display of recorded information was made below the thumbnail display, but this may also be effected above the thumbnail display or to the side thereof. It would also be fine to provide a separate display unit on monitor 41 and to collect and display the thumbnail displays thereon.

Figure 5:
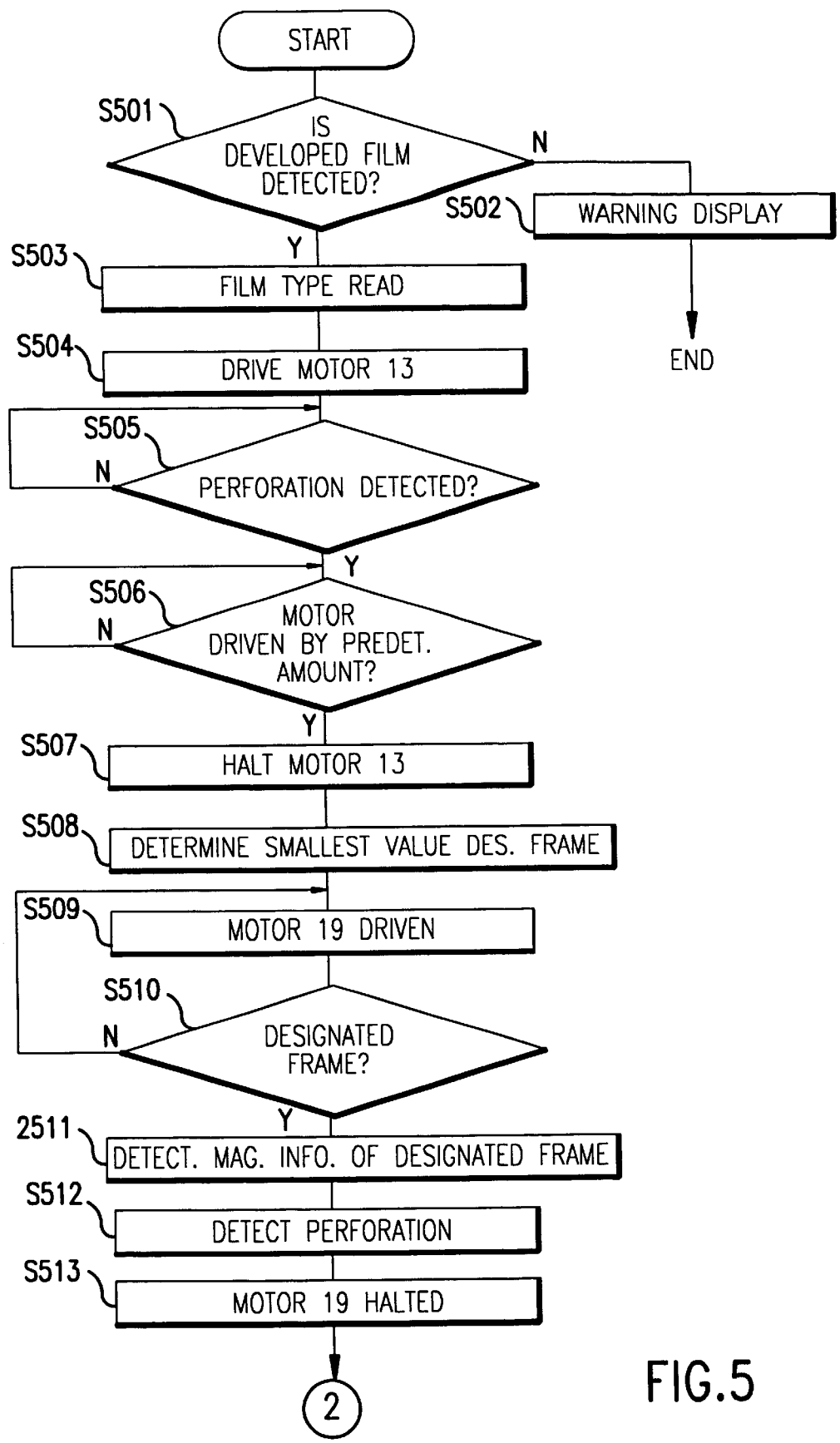
FIG. 5 is a flowchart illustrating a control of the device according to an embodiment of the present invention.
Figure 6:
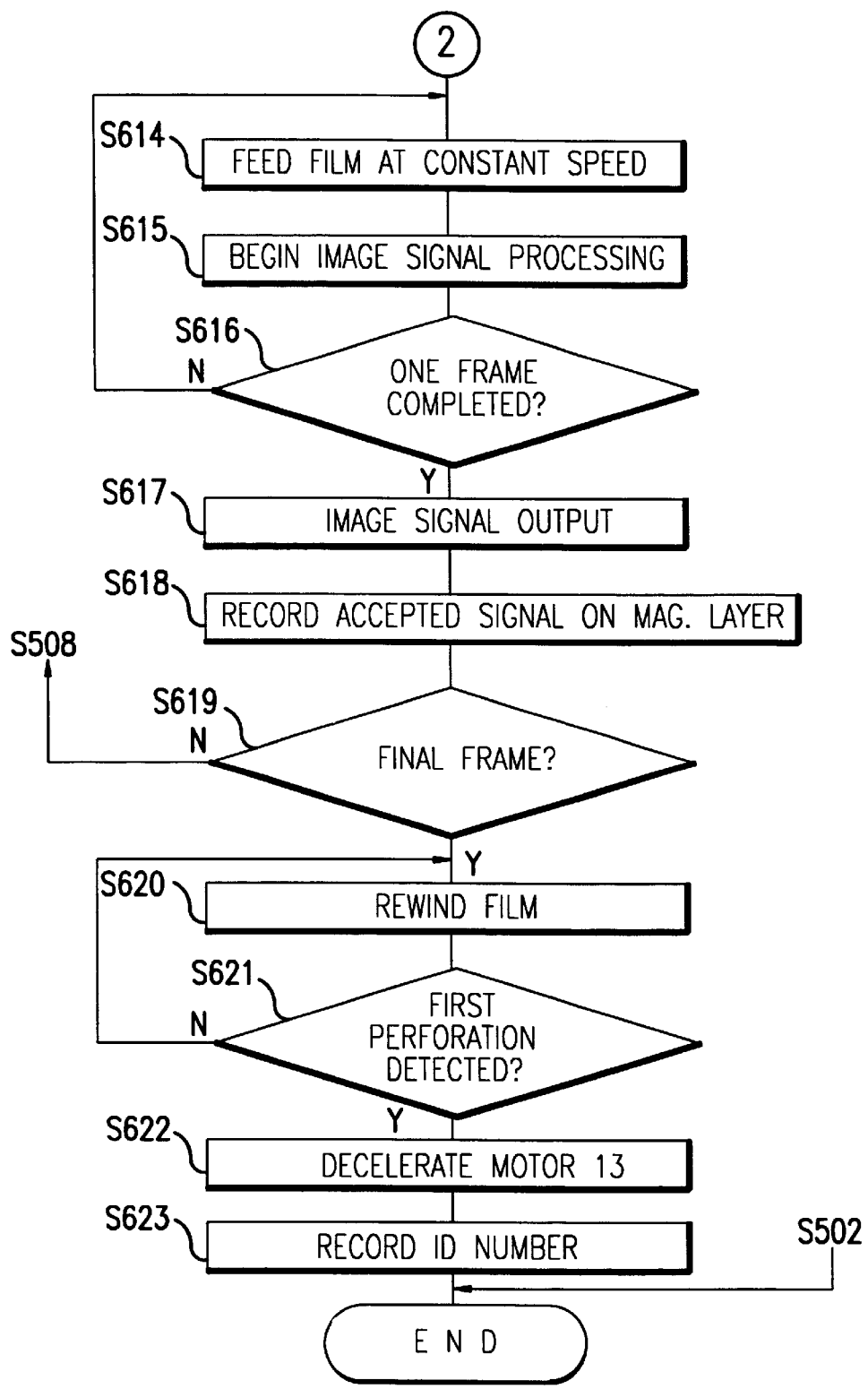
FIG. 6 is a flowchart illustrating a control of the device according to an embodiment of the present invention.

Next, a mode that produces a thumbnail display of the frame whose frame number is indicated by the user is described with reference to the flowcharts in FIGS. 5 and 6.

The user can select the frame designation thumbnail display from a menu display on monitor 41 using operation unit 42. Then, the user inputs the ID number of film cartridge 51. Next, the user indicates the frame numbers of the images that are to be displayed in a thumbnail display, the indication being made using operation unit 42. Following this, computer 40 indicates to microcomputer 2 to perform a frame designation thumbnail display. At this point, the flowchart in FIG. 5 starts.

Steps S501 to S507 are the same as steps S301 through S307 in FIG. 3, so explanation of such is omitted here.

In step S508, the determination is made as to what the smallest frame number is out of the those indicated by the user. Next, in step S509, a drive signal is output to motor drive circuit 18, and motor 19 is caused to be driven in the direction of winding. At this point, the connection between motor 13 and spool 51b is broken by transfer mechanism 14.

In step S510, magnetic head 25a reads magnetic recording part 54 and the determination is made as to whether the frame is a designated frame. When the determination is NO, the microcomputer returns to step S509 and driving of motor 19 is continued. When the determination is YES, the microcomputer moves to step S511.

In step S511, magnetic head 25a reads the recorded information on magnetic recording part 54, and outputs this recorded information to computer 40.

Computer 40 sends the recorded information to recording device 44, and the information is thus recorded on a recording medium. The recorded information read at this time includes the frame number, image direction information, photograph size information and color temperature information.

Next, when perforation detectors 17a and 17b detect a perforation 53 in step S512, a halt signal is output to motor drive circuit 18 in step S513. When this occurs, driving of motor 19 is halted, thereby halting feeding of the film. At this time, the tip of the film image is controlled so as to be on optical axis 15.

Figure 4:
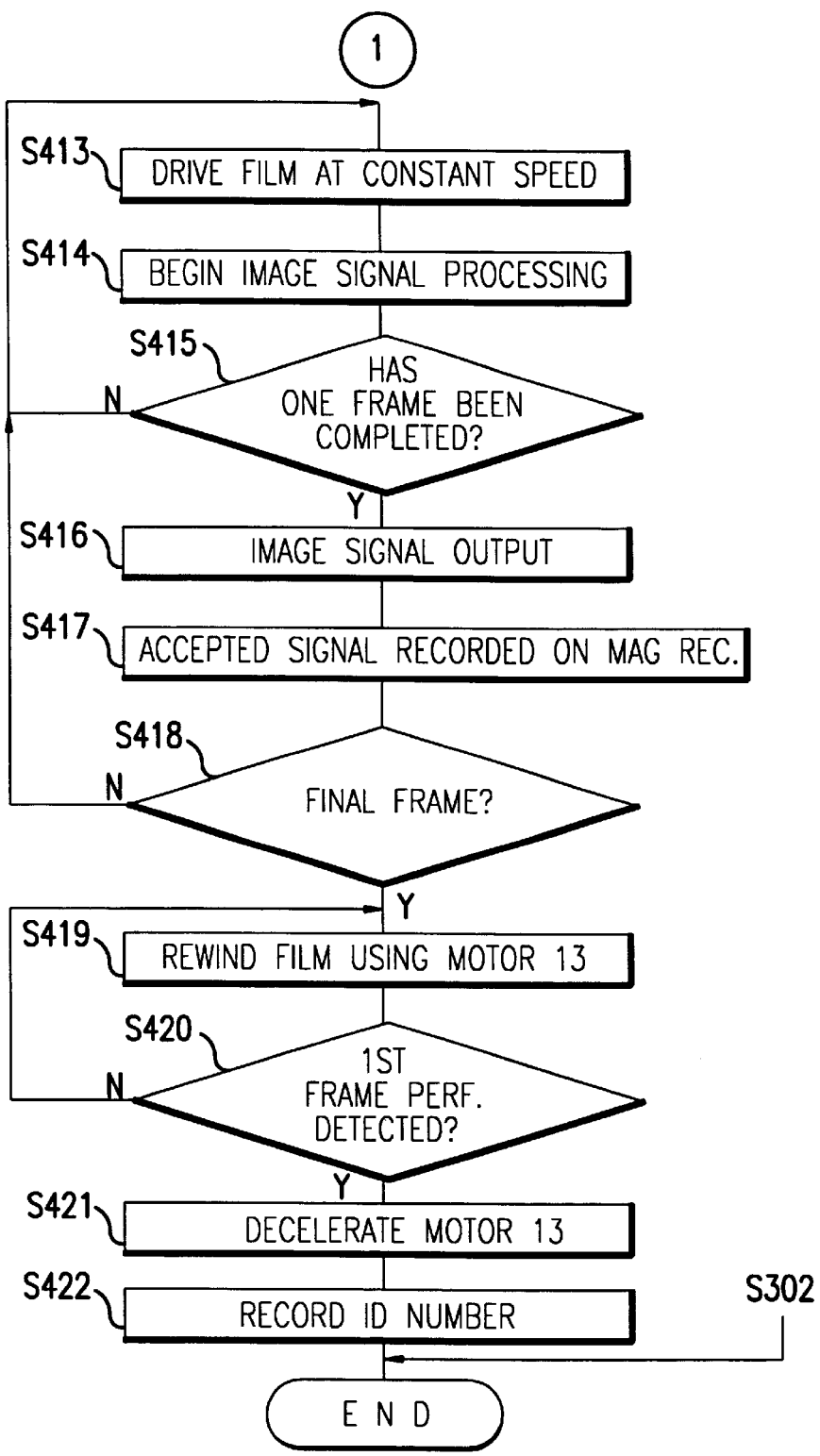
FIG. 4 is a flowchart illustrating a control of the device according to an embodiment of the present invention.

The processes in steps S513 through S617 (FIG. 6) are the same as the processes in steps S312 through S417 of FIGS. 3 and 4, so explanation of such is omitted here.

Next, in step S619, the determination is made as to whether the image accepted immediately before is the last designated frame. When the determination is NO, the microcomputer returns to step S508 and repeats the above-described processes. When the determination is YES, the microcomputer moves to step S620.

The steps from step S620 to the end are the same as the steps from step S419 on in FIG. 4, so explanation of such is omitted here.

In steps S511 and S617, the output destination of information was computer 40, but this may also be connected to a transmission device.

In addition, in the above embodiment, operation unit 42 was taken to be attached to computer 40, but a configuration may also be used wherein operation unit 42 is attached directly to microcomputer 2.

A controller causes a thumbnail display of a plurality of images on the display by outputting image signals to the display. The controller causes the display of display information relating to the retrieval signal on the display by outputting retrieval signals to the display, and consequently, when images are read into a personal computer or the like, it is possible for the user to see simultaneously the thumbnail display and information about a plurality of images that are recorded on the magnetic recording layer.

In addition, the data recorder records recognition information of the film on the magnetic recording unit, and consequently, the user can easily manage the film.

Figure 7:
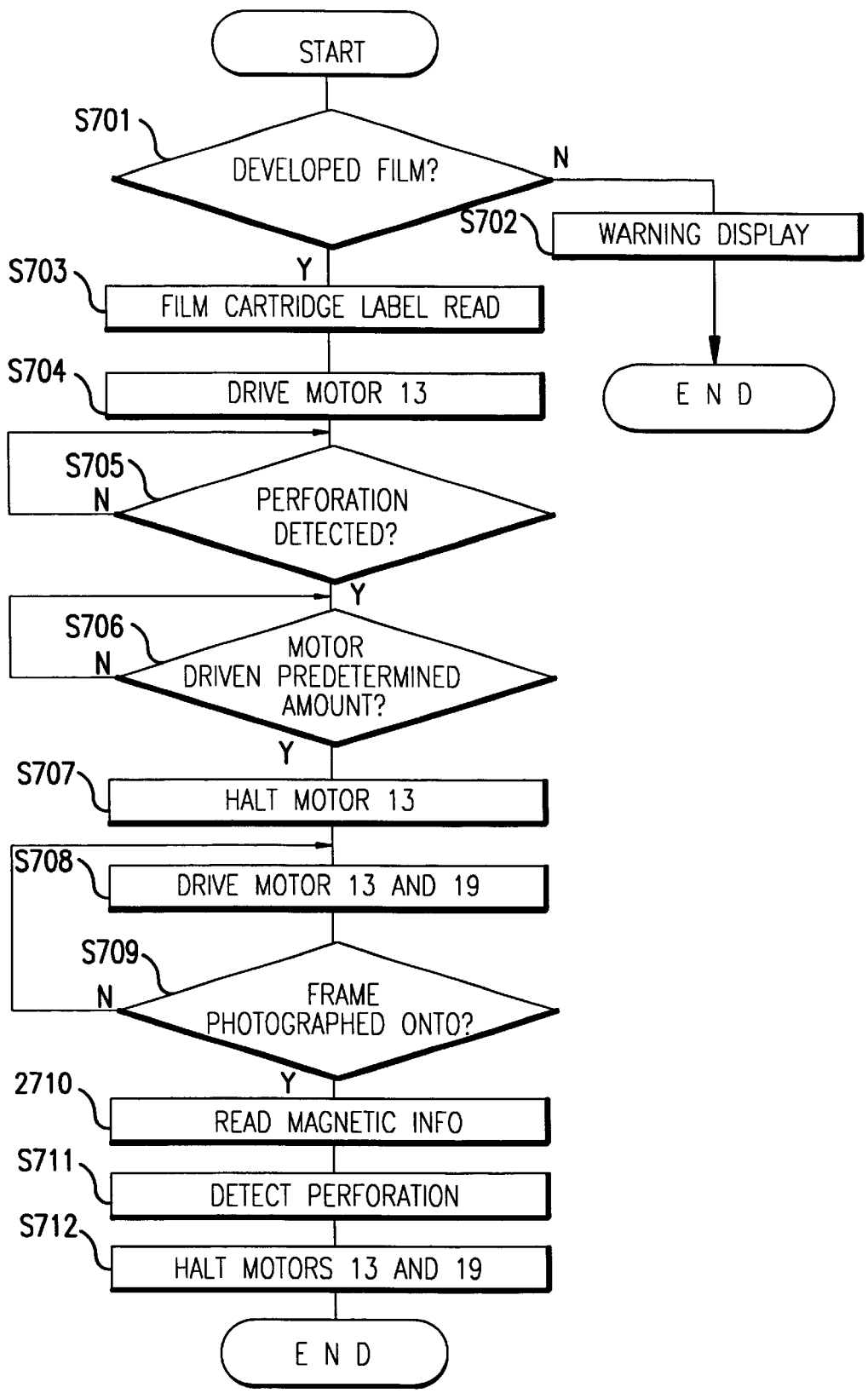
FIG. 7 is a flow chart illustrating film setting in the embodiment.

Next, the present device will be described in conjunction with the flow chart shown in FIG. 7.

The operator mounts a film cartridge 51 in a cartridge mounting chamber 11a. Then the operator begins the start mode by reading a film image from the keyboard 42 of the computer 40. Here, unless the film storage unit is closed and a limit switch provided in the film storage unit is turned on, the start mode will not begin. A start mode will be explained in reference to the flow chart in FIG. 7.

At S701, mounting of a film cartridge with developed film in the cartridge mounting chamber 1a is determined based on the results of detection by the detection unit 11a. If no mounting is detected, the program advances to step S702 and warns the computer 40 that the film cartridge 51 is not mounted or that the film 52 has not been developed. Here, a display device can be provided in the scanner 100 to display the above-stated warning on the display device. By determining whether a cartridge with developed film is mounted, erroneous removal of an undeveloped cartridge 51 can be prevented.

If mounting is detected at step S701, the program moves to step S703. At step S703, the detection unit 11a detects the film type, the name of the manufacturer, and whether the film is black and white film or color film, etc.

Next, at step S704, driving signals are outputted from the motor driving circuit, and the motor 13 begins rotation. The driving power from the motor 13 is transmitted to the spool 51b through the transmission mechanism 14. In this manner, the tip of the film 52 is advanced from the film exit aperture unit 51a located in the main body of the cartridge.

Next, at step S705, the program waits for the perforation detection unit 17a to detect a perforation 53a of frame number "0." Upon detecting a perforation 53a, the program drives the motor 13 for a predetermined amount at step S706 and stops the motor 13 at step S707. When the motor 13 stops, the film 52 reaches the winding-side spool 16.

Next, at step S708, the program outputs a driving signal to the motor driving circuit 12 and the motor driving circuit 18, causing the motor 13 to begin the feeding drive and the motor 19 to begin the winding drive.

Next, in step S709, magnetic head 25a reads the data in magnetic recording part 54, and the determination is made as to whether that frame has been photographed onto. When the determination in step S709 is NO, the microcomputer returns to step S708, and continues driving motors 13 and 19. Through this, useless frames are fast-forwarded, thereby allowing the time needed for thumbnail display to be reduced.

When the determination in step S709 is YES, the microcomputer moves to step S710. In step S710, magnetic head 25a reads the recorded information on the magnetic recording part 54. The recorded information is output to computer 40. Computer 40 sends the recorded information that has been received to recording device 44, and records this information on a recording medium. The recorded information read at this time includes the frame number, the date and time of photography, image direction information, photograph size information and color temperature information. The image direction information is information indicating whether the image is a vertical position photograph or a horizontal position photograph. The photograph size information is information indicating what size the photographed image is, such as normal size, panorama size, hi-vision size or half size, and also indicates which portions of the photograph image can be trimmed.

Next, when perforation detector 17a detects a perforation 53 in step S711, a halt signal is output to motor drive circuits 12 and 18 in step S712. Accordingly, driving of motors 13 and 19 is halted, and feeding of the film is also halted. At this time, control is such that the tip of the film image is positioned on optical axis 15.

Figure 8:
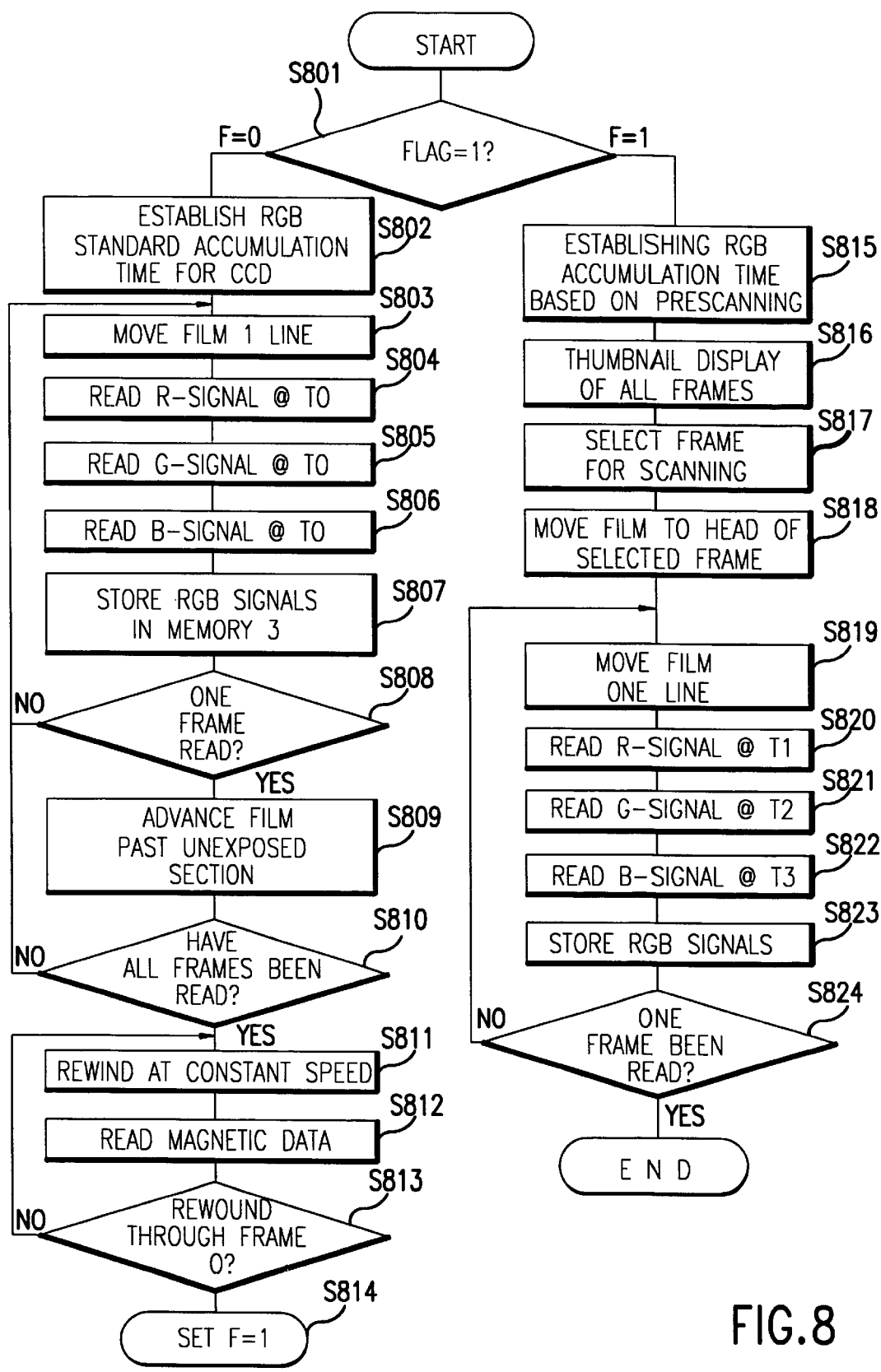
FIG. 8 is a flow chart illustrating prescanning and scanning in the embodiment.

FIG. 8 is another embodiment describing a flow chart of prescanning (F=0) and scanning (F=1).

At step S801, the value of the flag is checked to see if it is 1. If the flag is 0, the program advances to step S802 and executes the prescanning operation. If the flag is 1, it advances to step S815 to execute the scanning operation.

At step S802, the RGB charge accumulation time of a one-dimensional CCD 21 is set to a standard time T0. This standard time T0 is determined by numerous experimental values obtained by reading the film 52.

At step S803, the film 52 is moved the equivalent of one line. Then the accumulated time T0 is read with the R signal (step S804), the accumulated time T0 is read with the G signal (step S805), and the accumulated time T0 is read with the B signal (step S806). These RGB signals are stored in the frame memory 3 (step S807).

At step S808, movement of the film the equivalent of one frame (36 mm for example) is determined. If the amount of advancement per one line is 0.1 mm, a counter determines whether the film is advanced the equivalent of 360 lines. If the film is found not to be moved the equivalent of one frame, the program returns to step S803, otherwise it advances to step S809.

At step S809, the unexposed sections 56 (FIG. 2) of the film 52 between frames are moved with high speed. By not moving the sections between frames the equivalent of one line, the total prescanning time can be shortened when reading the images of a plurality of frames during prescanning.

At step S810, reading of the film the equivalent of the entire set of frames is determined. The total number of frames is established by the total number of frames of the film obtained by the detection circuit 11. If film equivalent to the entire set of frames is not read, the program returns to step S803, otherwise it advances to step S811.

At step S811, the film 52 is rewound at a specified speed. During rewinding, the magnetic recording data of the magnetic recording section 54 is read by the magnetic head 25 (step S812). The data is outputted to the computer 40. The computer 40 sends the stored data to a recording device 44 where the data are stored on a memory medium. The magnetic memory data read here includes frame number, shooting date, camera posture data, shooting size data, and color temperature data. Camera posture data indicates whether vertical position shooting or horizontal position shooting is used to obtain the image. Shooting size data indicates whether the shooting image is normal size, panorama size, high vision size, half size, or others, as well as whether and which section of the shooting image is to be trimmed.

At step S813, rewinding of the film 52 through frame "0" is determined. If the film is not rewound through frame "0," the program returns to step S811, otherwise it advances to step S814.

At step S814, the flag is changed to F=1 to execute scanning and the program awaits execution until the scanning command is received from the computer 40. Moreover, the image signals stored in the frame memory 3 are transferred to the computer 40. Here, if the capacity of the frame memory 3 is small or if the frame memory 3 is line memory, the image signals stored in the frame memory 3 can be transferred to the computer 40 after step S808.

Here, reading of the RGB image signals is executed for each line during feeding of the film and reading of the magnetic data is executed during rewinding of the film, but it is equally effective to read the magnetic data during feeding of the film and to read the RGB image signals for each line during rewinding of the film.

If the flag is F=1, the program advances to step S815 to execute scanning.

At step S815, the accumulation time of the CCD is established to obtain the optimum image. For example, the RGB accumulation times T1, T2, and T3 of the CCD 21 can be determined for each frame by obtaining the white level and the black level for each frame from the image signals obtained by prescanning.

At step S816, the images of the entire set of frames obtained by prescanning are thumbnail displayed on the monitor 41.

At step S817, the operator specifies on the monitor 41 the frame to be scanned using an operation unit 42 such as a mouse. The microcomputer 2 receives the frame specified by the computer 40 to be read (frame number 6, for example). Then the motor driving circuits 13 and 18 move the film 52 to the head of the specified frame (step S818). At step S819, the film 52 is moved the equivalent of one line. Then the R signal is read with the accumulation time T1 (step S820), the G signal is read with the accumulation time T2 (step S821), and the B signal is read with the accumulation time T3 (step S822. These RGB signals are stored in the frame memory 3 (step S823).

At step S824, movement of the film the equivalent of one frame is determined. The criteria for determination are the same as in the explanation of step S808. If the film is found not to be moved the equivalent of one frame, the program returns to step S819, and the program (after optionally displaying the scanned image on the monitor) finishes if the film is found to be moved the equivalent of one frame.

Next, operation of the image signal processing circuit 22 and display of the image data on the monitor 41 will be explained in reference to FIG. 9.

The black level output from the one-dimensional CCD 21 is set at a predetermined standard voltage value by a setting circuit 921, and the white level output from the one-dimensional CCD 21 is maintained for a predetermined time by a sample hold circuit 922. A shading correction circuit 923 executes shading correction to make the output from the one-dimensional CCD uniform throughout all the pixels. Moreover, a Γ-correction circuit 924 executes rΓ-correction in order to add gradation characteristics to the shading-corrected output. The Γ-corrected output is converted to digital signals by an A/D conversion circuit 925. For example, if digital signals are displayed by 8 bits, the analog output for each pixel is converted to 0–225 levels of digital signals that are stored in the frame memory 3 via the microcomputer 2.

The RGB image signals stored in the frame memory 3 are transmitted to the RAM 43 in the computer 40 via an SCSI interface. Moreover, data from the detection circuit 11 and the magnetic recording retrieval device 25 is transmitted to the memory circuit 46 in the computer 40 via the SCSI interface.

If the data from the memory circuit 46 indicates that negative film is mounted, then the processing circuit 47 reverses and outputs on the monitor 41 the image signals stored in the RAM 43. Furthermore, if the data from the memory circuit 46 indicates that shooting is done with the camera in the vertical position, then the processing circuit 47 rotates the image signals 90° and outputs them on the monitor 41. Moreover, if the data from the memory circuit 46 is trimming data (panorama size), the processing circuit 47 outputs the image signals according to the trimming data on the monitor 41. Here, the processing circuit 47 is composed of a LUT (look up table), etc.

Next, the process involved in displaying image signals and shooting condition signals on the monitor 41 will be explained.

Figure 9:
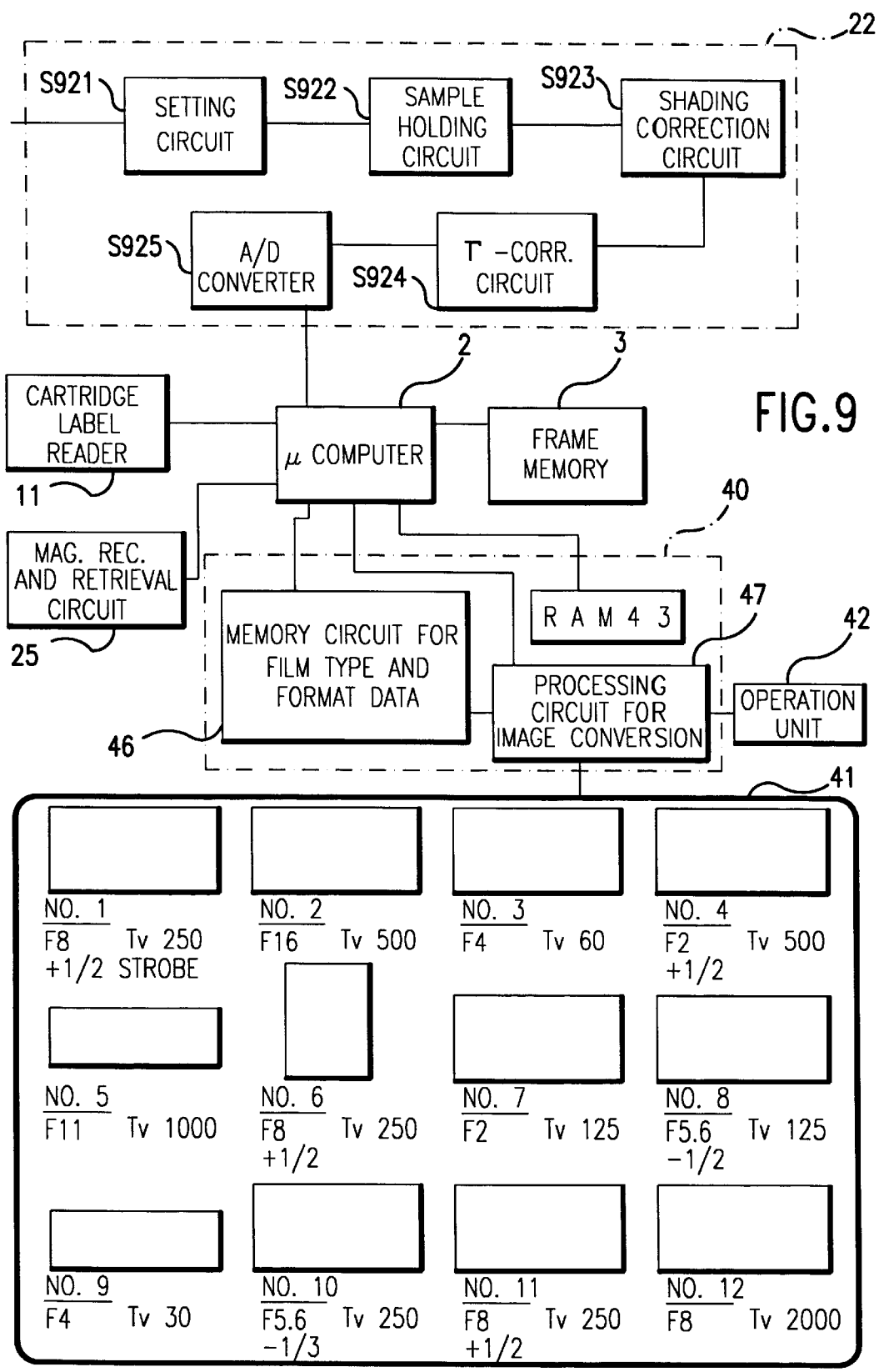
FIG. 9 is a block diagram illustrating thumbnail display and image prescanning.

FIG. 9 describes an example in which frame 1–frame 12 are thumbnail displayed. "No. 1," "F8," "Tv250," "+½," and "Strobe" are displayed at the bottom of the image of frame 1 obtained by prescanning. "No. 1" indicates frame 1. "F8" indicates the lens stop during shooting was F8. "Tv250" indicates the shutter speed during shooting was $\frac{1}{250}$ second. "+½" indicates the exposure correction value during shooting was +½. "Strobe" indicates that shooting was done with strobe shooting. Here, these indications are merely examples, and other indications such as the shooting date can be displayed, and the layout is not limited to the example.

Moreover, if it is found from the data read from the magnetic recording layer that shooting is done in panorama size mode, the image signals are enlarged and displayed like the images in frame 5 and frame 9. Furthermore, if it is found from the data read from the magnetic recording layer that shooting is done with the camera in the vertical position, the image signals are rotated 90° and displayed like the images in frame 6 and frame 11.

By displaying the data on the monitor 41 using the magnetic recording data in this manner, the operator can verify, at a glance, the conditions during shooting.

Next, the scanner 101 is explained in the case when a film cartridge having two winding axes is used.

Figure 10:
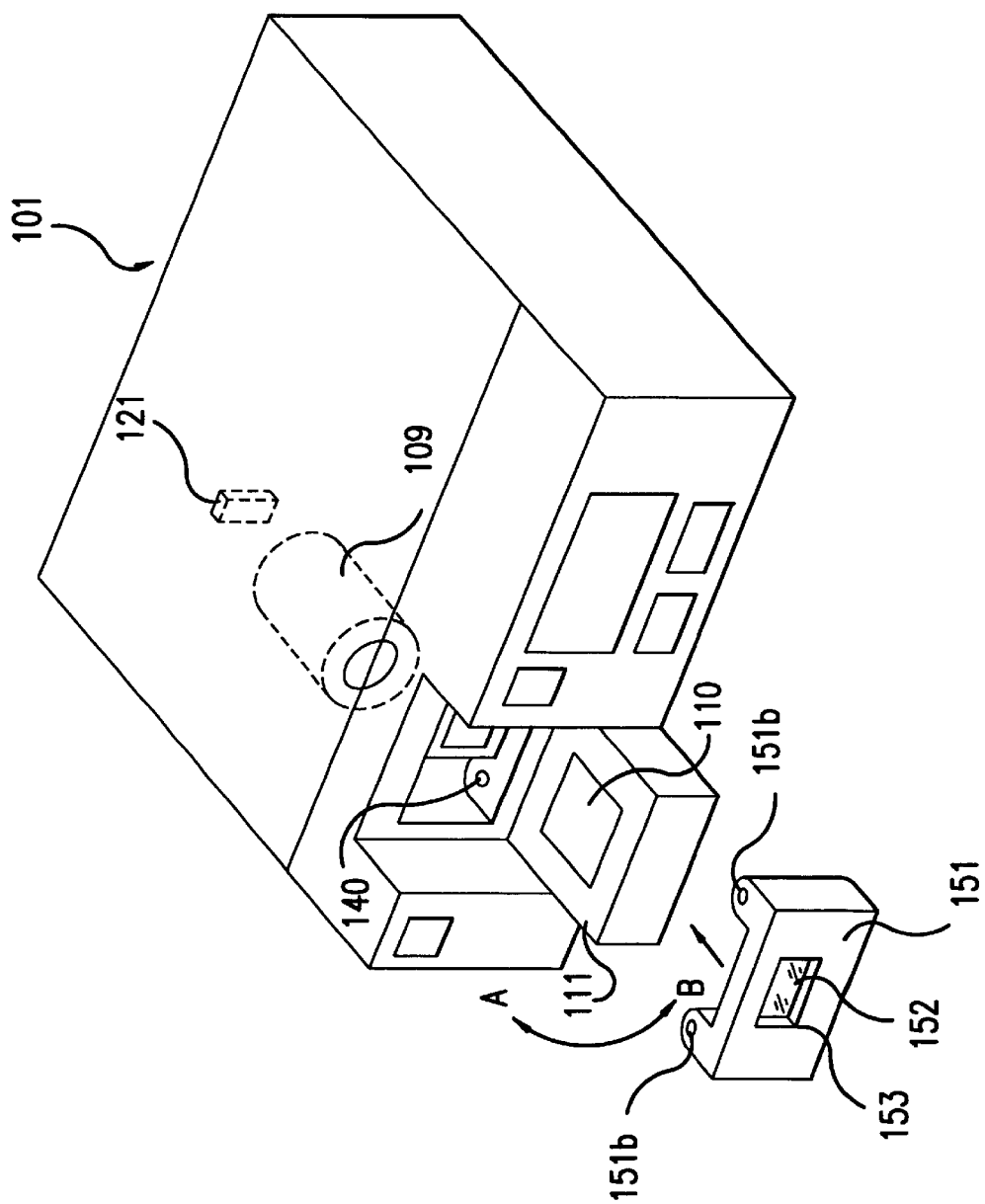
FIG. 10 is an exterior view of an embodiment of a scanner using another type of film cartridge.

The above-stated film cartridge 51 has only one winding axis, but the film cartridge 151 described in FIG. 10 has two winding axes 151b on each side of the cartridge 151. An aperture unit 153 is formed between the two winding axes 151b. The film 152 is the same as the film 52 comprising the above-stated magnetic recording unit.

Two transmission mechanisms 140 (only one of which is represented) are provided in the scanner 101. A cartridge cover 111 is capable of rotating in the direction of arrow A and/or arrow B. The cartridge cover 111 has an illumination unit 110 and an illumination driving circuit and the like. A projection lens 109 and a one-dimensional CCD sensor 121 are provided within the scanner 101.

The cartridge 151 is inserted in such a manner that each axis 151b of the cartridge 151 meshes with its respective transmission mechanism 140. After insertion of the cartridge 151, the cartridge cover 111 is closed in the direction of arrow A. Next, the illumination unit 110 illuminates the aperture unit 153. Here, use of the one-dimensional CCD sensor 121 eliminates the need for illuminating the aperture unit 153 entirely with uniform light. Light passing through the film 152 is gathered by the projection lens 109. Then the image light composed by the one-dimensional CCD sensor 121 is converted into electrical signals.

The transmission mechanism 140 is controlled in such a manner that the film 152 moves one line at a time. As for the other operations, they are the same as the operations in the embodiments described in FIG. 3–FIG. 9. Additionally, the cartridge 151 can be used in conjunction with the flowcharts shown in FIGS. 11–20, 23 and 24.

In the present invention, a one-dimensional light source conversion means or converter can be used to read images of film in a cartridge even when finished developed film is stored in the cartridge. If a magnetic recording layer is provided on the film, the magnetic recording data can be read when the film is transported with a uniform velocity.

Moreover, transport of the original during reading of the image data and during reading of the magnetic data can be executed without hindrance by controlling the motion of the transport mechanism using a transport control means.

Figure 11:
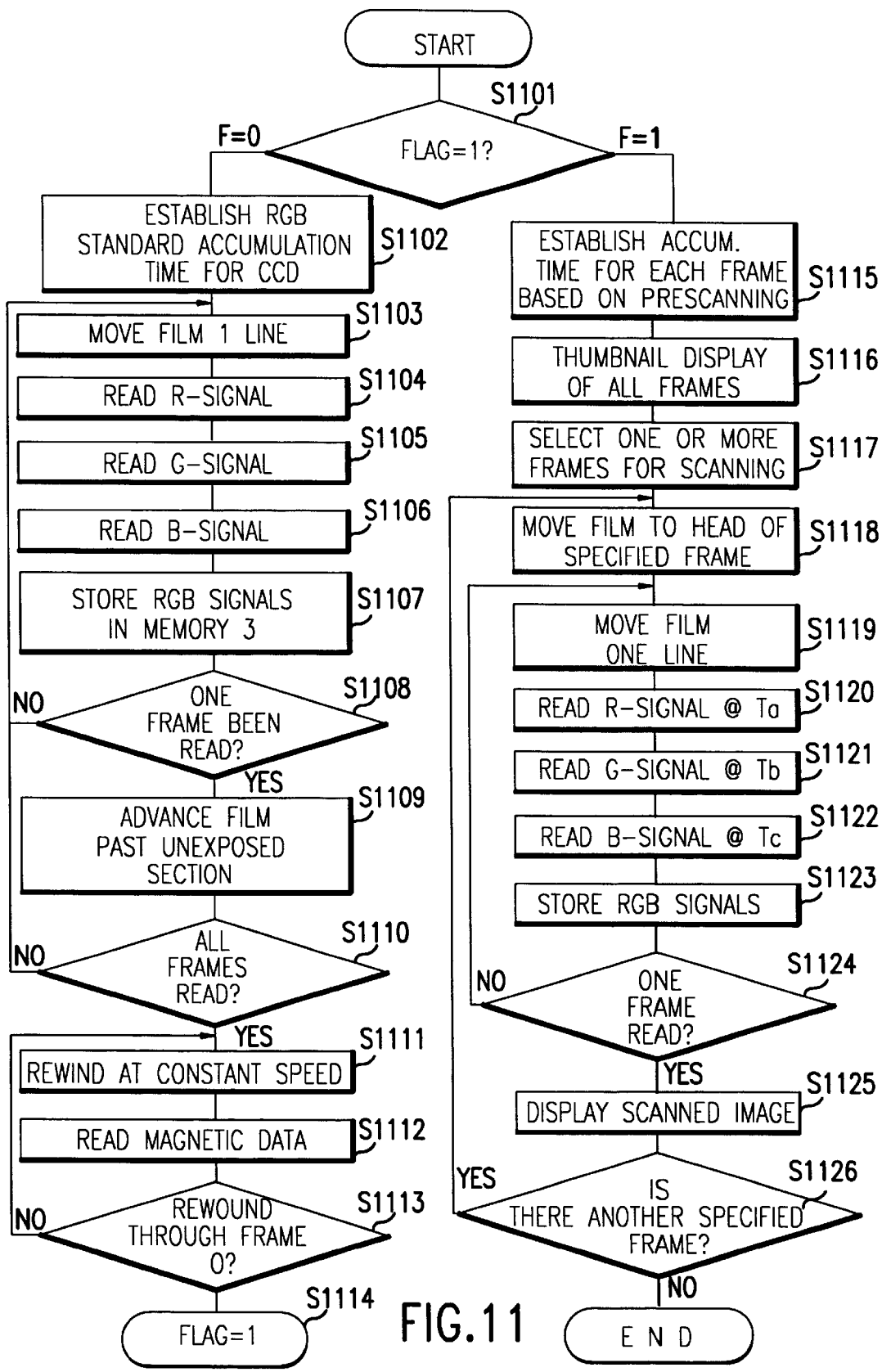
FIG. 11 is a flow chart illustrating prescanning and scanning in the first embodiment.
Figure 12:
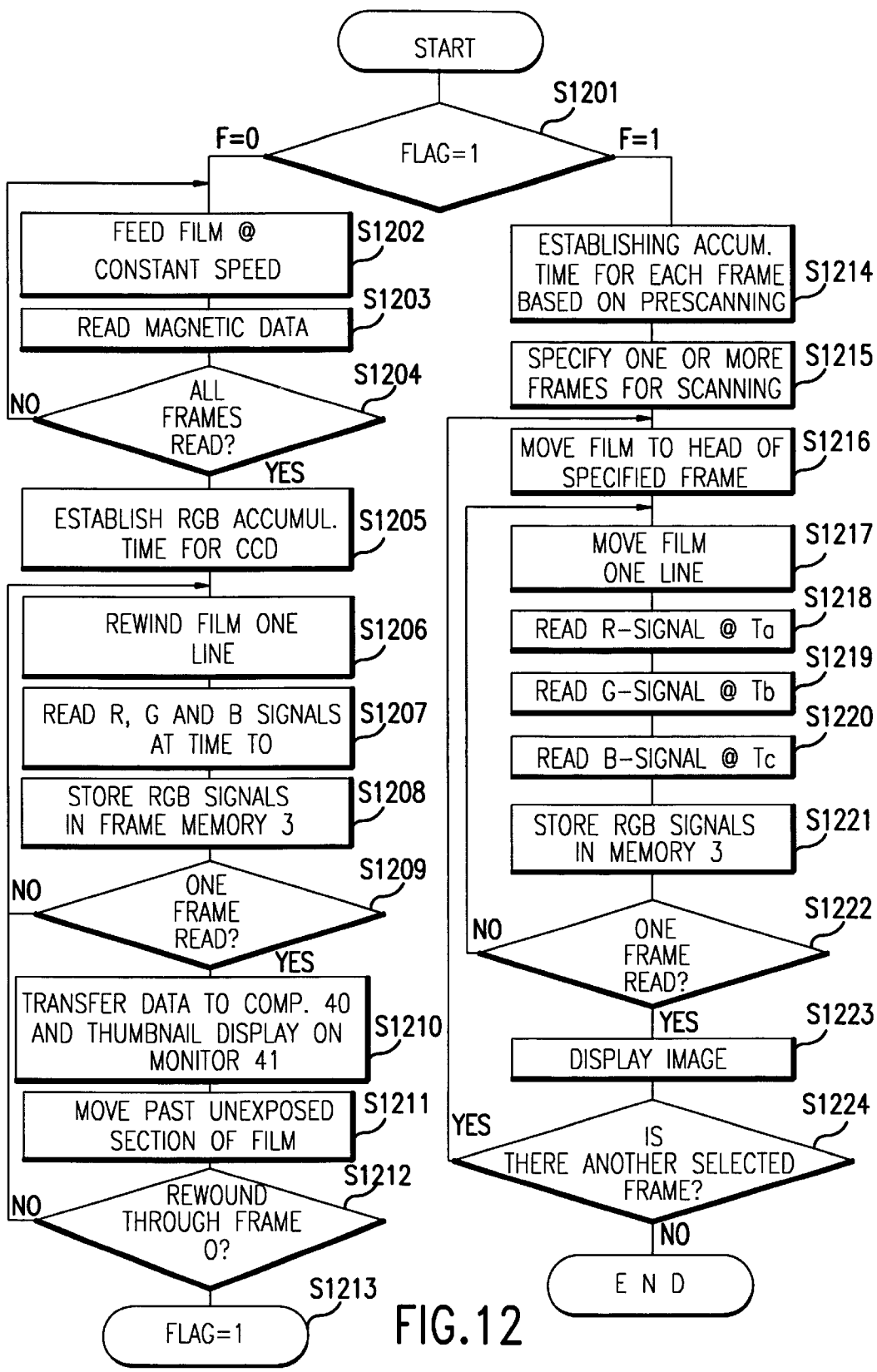
FIG. 12 is a flow chart illustrating prescanning and scanning in the second embodiment.

FIG. 11 is another embodiment describing the flow chart of prescanning (F=0) and scanning (F=1) and displaying at least one designated scanned image. (In FIG. 11, steps S1101–1114 are similar to steps S801–814 of FIG. 8).

At step S1101, the value of the flag is checked to see if it is 1. If the flag is 0, the program advances to step S1102 and executes the prescanning operation. If the flag is 1, it advances to step S1115 to execute the scanning operation.

At step S1102, the RGB charge accumulation time of the one-dimensional CCD sensor 21 is set to a standard time T0. This standard time T0 is determined by numerous experimental values obtained by reading the film 52.

At step S1103, the film 52 is moved the equivalent of one line. Then, the accumulated time T0 is read with the R signal (step S1104), the accumulated time T0 is read with the G signal (step S1105), and the accumulated time T0 is read with the B signal (step S1106). These RGB signals are stored in the frame memory 3 (step S1107).

At step S1108, movement of the film the equivalent of one frame (36 mm, for example) is determined. If the amount of advancement per one line is 0.1 mm, a counter determines whether the film has advanced the equivalent of 360 lines. If the film is found not to be moved the equivalent of one frame, the program returns to step S1103, otherwise it advances to step S1109.

At step S1109, unexposed sections 56 of the film 52 between frames are moved with high speed. By not moving the sections between frames the equivalent of one line, the prescanning time can be shortened when reading the images of a plurality of frames during prescanning.

At step S1110, reading of the film the equivalent of the entire set of frames is determined. The total number of frames is established by the total number of frames of the film obtained by the detection circuit 11. If the film equivalent to all the frames is not read, the program returns to step S1103, otherwise it advances to step S1111.

During the rewinding, the magnetic recording data of the magnetic recording unit 54 is read from the magnetic head 25 (step S1112). The data is output to the computer 40. The computer 40 sends these stored data to a recording device 44 where the data is stored on a memory medium. The magnetic memory data read here includes the frame number, the shooting date, data concerning camera posture, shooting size data, and color temperature data. Camera posture data indicate whether vertical position shooting or horizontal position shooting is used to obtain the image. Shooting size data indicate whether the shooting image is normal size, panorama size, high vision size, half size, or others, as well as whether and which section of the shooting image is to be trimmed.

At step S1113, rewinding of the film 52 through frame "0" is determined. If the film is not rewound through frame "0," the program returns to step S1111, otherwise it advances to step S1114.

At step S1114, the flag is changed to F=1 to execute scanning. In addition, the image signals stored in the frame memory 3 and the magnetic recording data are transferred to the computer 40. In this instance, if the capacity of the frame memory 3 is small, or if the frame memory 3 is line memory, the image signal stored in the frame memory 3 can be transferred to the computer 40 after step S1108.

If the flag is F=1, scanning takes place at step S1115.

At step S1115, the accumulated times Ta, Tb, and Tc of the CCD sensor 21 are determined for R, G, and B, respectively, by obtaining the white level and the black level, etc., for each frame based on the image signal obtained by prescanning. For example, the fourth frame has 3 milliseconds for R, 4 milliseconds for G, and 6 milliseconds for B, while the ninth frame has 2 milliseconds for R, 2 milliseconds for G, and 5 milliseconds for B.

At step S1116, all the frames are thumbnail displayed on the monitor 41 connected to the computer 40.

At step S1117, the operator selects from among the plurality of frames on the monitor 41 the frame to be scanned. The frame on the field can be specified by a mouse 42, or a frame number can be entered from the keyboard, or it is possible to command scanning of all the frames. With the above specification, scanning begins. In the present embodiment, cases in which the sixth frame and the twelfth frame are specified by the operator will be explained. The microcomputer 2 receives the frame numbers of the sixth frame and the twelfth frame. Based on these numbers, the motor driving circuits 13 and 18 move the film 52 to the head of the sixth frame, which is the smaller number (step S1118).

At step S1119, the film 52 is moved the equivalent of one line by the motor driving circuits 13 and 18. Then the R signal is read with the accumulation time Ta6 (step S1120), the G signal is read with the accumulation time Tb6 (step S1121), and the B signal is read with the accumulation time Tc6 (step S1122). These RGB signals are stored in the frame memory 3 (step S1123).

At step S1124, movement of the film the equivalent of one frame is determined. The determination process is the same as in the explanation of prescanning at step S1108. If the film is found not to be moved the equivalent of one frame, the program returns to step S1119, otherwise it advances to step S1125. At step S1125, the image data read during scanning with a high level of precision is displayed on the monitor 41.

At step S1126, the completion of scanning of all the specified frames is determined. In the present example, the twelfth frame has not yet been scanned, and therefore the program moves to step S1118. The film is moved to the head of the twelfth frame. The R, G, and B signals are read for each line with the accumulated times Ta12, Tb12, and Tc12 (step S1119–step S1124), and each signal is displayed on the monitor 41 after reading one frame (step S1125).

Incidentally, it is equally effective to display only the first specified frame on the monitor 41 without displaying on the monitor 41 the image of the specified frame after each scanning and to have the data stored in the memory device 44 without displaying on the monitor 41 until the operator commands display of the next specified frame after completion of scanning. With the completion of scanning of the twelfth frame, scanning of all the specified frames is completed, hence the program moves to NO indicating completion of scanning.

In FIG. 11, reading of the RGB image signals is executed for each line during the feeding of the film, and reading of the magnetic data is executed during the rewinding of the film, but it is equally effective to read the magnetic data during the feeding of the film and to read the RGB image signals for each line during the rewinding of the film. This will be explained as another prescanning/scanning embodiment with reference to FIG. 12.

At step S1201, the value of the flag is checked to see if it is 1. If the flag is 0, the program advances to step S1202 and executes the prescanning operation. If the flag is 1, it advances to step S1214 to execute the scanning operation.

At step S1202, the film 52 is rewound on take-up spool at a specified speed. During the rewinding, the magnetic recording data of the magnetic recording unit 54 is read from the magnetic head 25 (step S1203). The data is output to the computer 40. The computer 40 sends the stored data to the recording device 44 where the data is stored on a memory medium. At step S1204, reading of the amount equivalent to the entire set of frames by the film 52 is determined. If the amount equivalent to the entire set of frames is not read by the film 52, the program returns to step S1202, otherwise it advances to step S1205.

At step S1205, the RGB charge accumulation time of a one-dimensional CCD sensor 21 is set to be a standard time T0. This standard time T0 is determined by numerous experimental values obtained by reading the film 52.

At step S1206, the film 52 is moved in the direction of rewinding the equivalent of one line. Then the accumulated time T0 is read with the R signal, the G signal, and the B signal (step S1207). These RGB signals are stored in the frame memory 3 (step S1208).

At step S1209, movement of the film the equivalent of one frame (36 mm, for example) is determined. If the amount of advancement per one line is 0.1 mm, a counter determines whether the film is advanced the equivalent of 360 lines. If the film is found not to be moved the equivalent of one frame, the program returns to step S1206, otherwise it advances to step S1210.

At step S1210, the image signals of the RGB signals stored in the frame memory 3 are transferred to the computer 40. Since the magnetic recording data is already transferred to the computer 40 at step S1203, a thumbnail display is executed on the monitor 41 in accordance with the magnetic data. For example, if the twelfth frame is determined to be shot with a panorama mode based on the magnetic data of the twelfth frame, the image data of the twelfth frame is thumbnail displayed on the monitor 41 as panorama size, and if the tenth frame is determined to be shot with a vertical position of the camera based on the magnetic information of the tenth frame, the image data of the tenth frame is thumbnail displayed on the monitor 41 in a vertical direction. In the case of a thumbnail display of the image data based on the magnetic data as described above, there is the merit of not needing extensive image data in the frame memory, etc.

At step S1211, unexposed sections 56 of the film 52 between frames are moved with high speed. By not moving sections between frames the equivalent of one line, the prescanning time can be shortened when reading the images of a plurality of frames during prescanning.

At step S1212, reading of the film through frame "0" is determined. If the film is not read through frame "0," the program returns to step S1206, otherwise it advances to step S1213.

At step S1213, the flag is set to F=1 to perform subsequent scanning. If the flag is F=1, scanning takes place at step S1214.

At step S1214, the accumulated times Ta, Tb, and Tc of the CCD sensor 21 are determined for R, G, and B, respectively, by obtaining the white level and the black level, etc., for each frame based on the image signal obtained by prescanning. For example, the fourth frame has 3 milliseconds for R, 4 milliseconds for G, and 6 milliseconds for B, while the ninth frame has 2 milliseconds for R, 2 milliseconds for G, and 5 milliseconds for B.

At step S1215, the operator selects from among the plurality of frames on the monitor 41 the frame to be scanned. The frame on the field can be specified by the mouse 42, or the frame number can be entered from the keyboard, or it is possible to command scanning of all the frames. With the above specification, scanning begins. In the present embodiment, cases in which the fourth frame and the ninth frame are specified by the operator will be explained. The microcomputer 2 receives the frame numbers of the fourth frame and the ninth frame. Based on these numbers, the motor driving circuits 13 and 18 move the film 52 to the head of the fourth frame, which is the smaller number (step S1216).

At step S1217, the film 52 is moved the equivalent of one line by the motor driving circuits 13 and 18. Then the R signal is read with the accumulation time Ta4 (step S1218), the G signal is read with the accumulation time Tb4 (step S1219), and the B signal step (S1220) is read with the accumulation time Tc4. These RGB signals are stored in the frame memory 3 (step S1221).

At step S1222, movement of the film the equivalent of one frame is determined. The criteria for determination are the same as in the explanation of step S1209. If the film is found not to be moved the equivalent of one frame, the program returns to step S1217, and the program moves to step S1223 if the film is found to be moved the equivalent of one frame.

At step S1223, each specified image is displayed on the monitor 41 after each scanning and the data is stored in the memory device 44 without displaying on the monitor 41 until the operator commands display of the next specified frame after completion of scanning. At step S1224, a determination is made as to whether there is a next specified frame to be displayed. If yes, the program returns to step S1216. If no, the program ends. With the completion of scanning of the ninth frame in the above example, scanning of all the specified frames is completed, hence the program moves to NO indicating completion of the scanning.

The operation of the image signal processing circuit 22 and display of the image data on the monitor 41 are the same as discussed above with reference to FIG. 9.

FIGS. 13A and 13B describe other examples of thumbnail display obtained by prescanning.

FIG. 13A describes another example in which frame 1–frame 12 are thumbnail displayed. "No. 1," "F8," "Nov. 22, 94," and "15:12" are displayed at the bottom of the image of frame 1 obtained by prescanning. "No. 1" indicates frame 1. "Nov. 22, 94" indicates the date of shooting. "15:12" indicates the time of shooting. In this instance, frame 6 and frame 11 are shot with the camera in the vertical position, hence the vertical position is indicated in one place. Frame 5 and frame 9 are shot in panorama size mode, hence panorama size mode is indicated in one place.

FIG. 13B describes another example in which frame 1–frame 24 are thumbnail displayed. Since the operator desires to verify all the image data of the film 52 in the cartridge 51 by prescanning, it is preferable to be able to change the size of each frame according to the film frame number. The film frame number in the present embodiment is easily established since the film frame number can be specified according to the magnetic recording data. "No. 1," "Tokyo," and "Dec. 06, 94" are displayed at the bottom of the image of frame 1 obtained by prescanning. "No. 1" indicates frame 1. "Tokyo" indicates the location of shooting. The location data is entered with the camera by the operator during shooting. "Dec. 24, 94" indicates the date of shooting. By displaying the magnetic recording data, the operator can easily specify the frame to be scanned. Moreover, it is equally permissible to thumbnail display the data on the monitor 41 by classifying them according to the date of shooting or location of shooting.

With the image reading system, the image data of a plurality of frames obtained during prescanning are made to be displayed on a monitor; hence the operator can easily specify the frames to be scanned. If the shooting size data, such as camera posture data and panorama size data, is obtained from the magnetic recording data, the image data is displayed on the monitor based on the data; hence the operator can easily select the frames to be scanned. The images of all the frames obtained during prescanning can be displayed on the monitor; hence the operator is not required to memorize specifically the frames to be scanned. The image data for each frame obtained during prescanning may be displayed on the monitor in order; hence the operator can easily specify the frame to be scanned.

Next, the actions of the device of yet another embodiment of the present invention will be described. The mode which prescans film 52 and makes thumbnail displays will be described with reference to the flowcharts in FIGS. 14 and 15.

Figure 14:
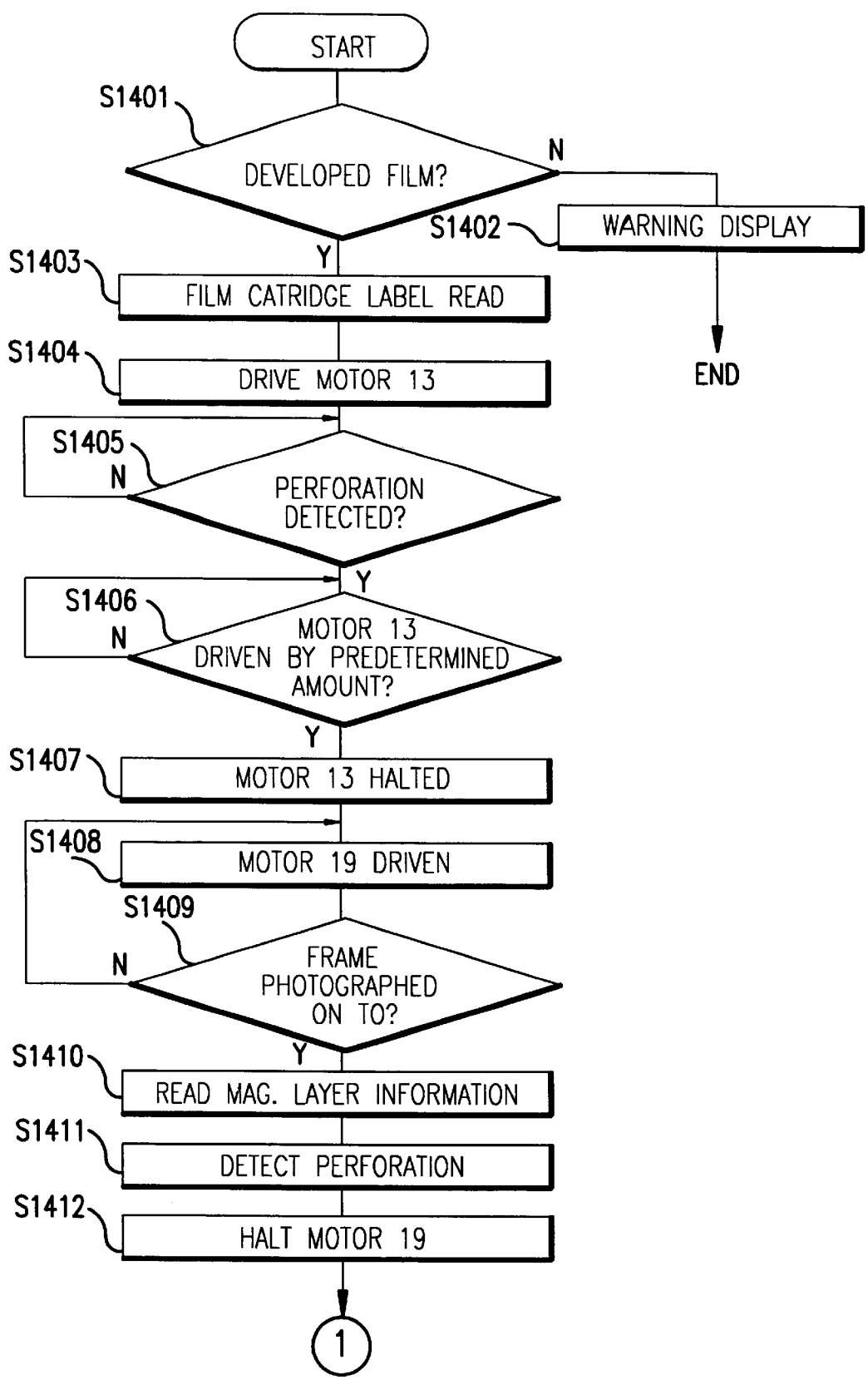
FIG. 14 is a flowchart illustrating a control of the device according to an embodiment of the present invention.

The user selects the all-frame thumbnail display from a menu displayed on monitor 41, the selection made using operation unit 42. Furthermore, the ID number of the film cartridge is input. The ID number is input in whatever combination of English characters, Chinese characters and numbers or the like which the user finds desirable. When this occurs, computer 40 commands of microcomputer 2 an all-frame thumbnail display. At this time, the flowchart in FIG. 14 is started.

In step S1401, the determination is made, on the basis of detection performed by developed film detector 11a, as to whether or not developed film cartridge 51 has been loaded in cartridge loading chamber 1a. When this determination is NO, the microcomputer 2 moves to step S1402, and warns computer 40 if film cartridge 51 has not been loaded or if film 52 is undeveloped. Computer 40 performs a warning display on monitor 41 in accordance with the warning received. It would also be acceptable to provide a display device on scanner 100 and to perform the warning on this display device. By determining whether a developed film cartridge is loaded, it is possible to prevent undeveloped film from being extracted from cartridge 51 erroneously.

When the determination in step S1401 is YES, the microcomputer moves to step S1403. In step S1403, the film type of film 52 is detected by developed film detector 11a.

Next, in step S1404, a drive signal is output to motor drive circuit 12, and motor 13 is driven. The drive power of motor 13 is transferred to spool 51b via transfer mechanism 14. Furthermore, the tip of film 52 is fed out from film exit opening 51a in the body of the cartridge. Next, in step S1405, the microcomputer waits for perforation detector 17 to detect perforation 53a of the "0" frame. When perforation 53a is detected in step S1405, motor 13 is driven by a specific amount in step S1406, and motor 13 is then halted in step S1407. When motor 13 is halted, motor 13 has been driven by a specific amount in step S1406 so that film 52 reaches winding-side spool 16. Next, in step S1408, a drive signal is output to motor drive circuit 18 and motor 19 is driven in the direction of winding. At this time, the connection between motor 13 and spool 51b is broken by transfer mechanism 14.

Next, in step S1409, magnetic head 25a reads the data in magnetic recording part 54, and the determination is made as to whether that frame has been photographed onto. When the determination in step S1409 is NO, the microcomputer returns to step S1408, and continues driving motor 19. Through this, useless frames are fast-forwarded, thereby allowing the time needed for thumbnail display to be reduced.

When the determination in step S1409 is YES, the microcomputer moves to step S1410. In step S1410, magnetic head 25a reads the recorded information in magnetic recording part 54. The recorded information is output to computer 40. Computer 40 sends the recorded information that has been received to recording device 44, and records this information on a recording medium. The recorded information read at this time includes the frame number, the date and time of photography, image direction information, photograph size information and color temperature information. The image direction information is information indicating whether the image is a vertical position photograph or a horizontal position photograph. The photograph size information is information indicating what size the photographed image is, such as normal size, panorama size, hi-vision size or half size, and also indicates which portions of the photograph image can be trimmed.

Next, when perforation detector 17a detects perforation 53 in step S1411, a halt signal is output to motor drive circuit 18 in step S1412. Accordingly, driving of motor 19 is halted, and feeding of the film is also halted. At this time, control is such that the tip of the film image is positioned on optical axis 15.

Next, in step S1513 (FIG. 15), a drive signal is output to motor drive circuit 18, and film 52 is fed at a constant speed. The feeding speed at this time is set as a faster value than during scanning. Furthermore, linear image sensor 21 is driven in step S1514 and roughly accepts the image, which undergoes image processing in image signal processing circuit 22. The processed image signal is stored in frame memory 3. Because the image is quickly prescanned the image can be accepted in a much shorter time than during scanning, and requires less memory capacity.

Then, the actions in steps S1513 and S1514 are repeated until it is verified in step S1515 that the acceptance of the image in one frame has been completed.

When the determination in step S1515 is YES, the microcomputer moves to step S1516. In step S1516, the image signal from frame memory 3 is output to computer 40. In addition, besides the image signal, the maximum signal level for each color RGB within the photo frame, the minimum signal level, and a histogram of the signal levels is output in step S1516.

Computer 40 responds to the input of the image signal by displaying a thumbnail display of the image on monitor 41. Computer 40 displays thumbnail images in a row on monitor 41 each time an image signal is input from scanner 100. When each display is made, recorded information such as the frame number and the like is displayed below the thumbnail displays, the information having been read from magnetic recording part 54.

The display on monitor 41 may be either a large display on the screen of each frame instead of a thumbnail display, or a display in which the display is initially large and then reduced in size to be a thumbnail display, or a thumbnail display of all images at once after all frames have been accepted. Alternatively, the display can switch vertical and horizontal in the case of vertical position photography as determined by information read from magnetic recording part 54. In addition, the display can trim the film images to only the necessary portions on the basis of the photography size information.

In addition, computer 40 outputs to recording device 44 the recorded information that has been sent, and records this information on the recording medium. The image signal is prescanned data, and it is possible to record this at high speed because the amount of data is small.

Next, in step S1517, the microcomputer waits until inputting of the setting values from computer 40 has been completed. At this time, it is possible for the user to input from operation unit 42 the trimming range, image orientation information, resolution, color correction, contrast adjustment, file name and file format.

The trimming range is determined by the user indicating the range to be trimmed from the thumbnail display using the mouse of operation unit 42.

The image orientation information is information indicating the format and display for the thumbnail display. For example, consider the case wherein a thumbnail display is displayed upside down. In this case, the user can indicate that the bottom portion of the thumbnail display is to appear at the top of the screen. When this occurs, it is possible to perform a display in the orientation indicated by the user during scanning.

The resolution is designated by inputting a numerical value, such as 1200 dpi, for example. The file name is designated by the user using the keyboard. The file format is designated by the user selecting a file format displayed on the screen. For formatting, it is possible to select JPEG format or BMP format or the like, for example.

When a signal indicating that inputting of the above-described setting values from computer 40 to microcomputer 2 has been completed, the microcomputer moves to step S1518.

In step S1518, the exposure time of linear sensor 21 during scanning is established from the histogram of the signal levels and the resolution set by the user. The exposure time of the present device is determined by the setting-of the film feeding speed. That is to say, a fast film feeding speed is set when the exposure time is to be shortened. Conversely, a slow film feeding speed is set when the exposure time is to be lengthened. In addition, in step S1518 a short exposure time is set if the signal level is high, while a long exposure time is set if the signal level is low. A slow film feeding speed is set if the resolution is high, while a fast film feeding speed is set if the resolution is low.

Figure 21:
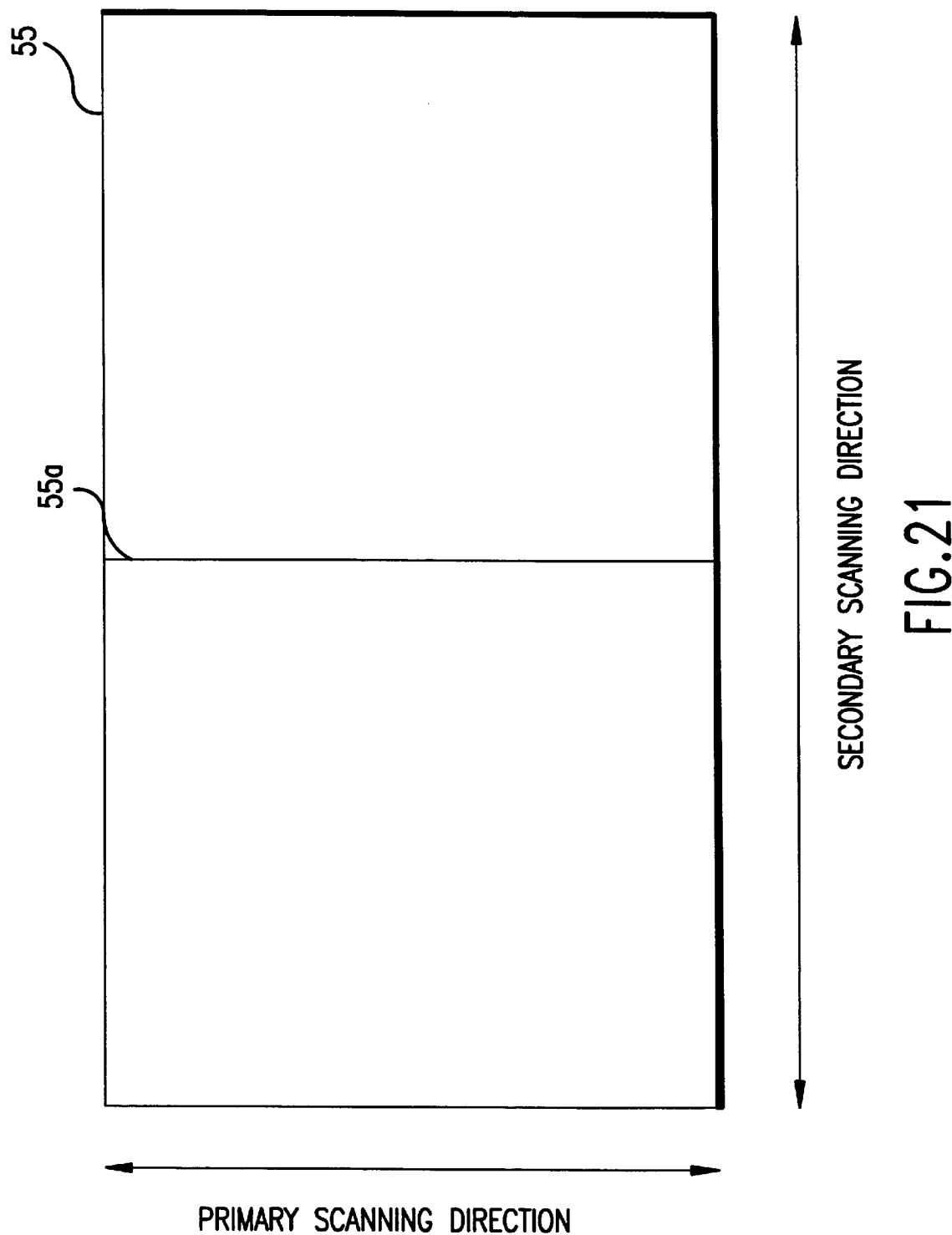
FIG. 21 is a drawing showing an image.

In step S1519, the sum (hereinafter called "SUM") of the differences of the output levels of adjacent pairs of pixels with respect to a below-described single line 55a (FIG. 21) is computed. The film focussing state is determined from the value of SUM. FIG. 21 is a drawing showing the image on film 52. A single line 55a in the primary scanning direction is a line substantially in the center of image 55 in the auxiliary scanning direction. In this line, the image is accepted at full pitch by prescanning.

Suppose that there are n pixels lined up in the primary scanning direction in linear image sensor 21. Let these pixels be designated 1, 2, 3, . . ., n. Furthermore, let a(1), a(2), a(3), . . ., a(n) be the output level of each pixel. Accordingly, SUM can be expressed as follows:

$$SUM = \sum_{i=2}^{n} |a(i) - a(i-1)|$$

With the present embodiment of the invention, when the value of SUM is large, it is determined that the film is substantially in the focus position and that an in-focus image is obtained. Conversely, when the value of SUM is small, it is determined that the film is shifted from the focus position due to warping or the like, and that an unfocussed image is obtained.

Following the processes in step S1519, the microprocessor advances to step S1520 and sets the filter process and brightness adjustment. With regard to the filter process, an edge emphasis process and a smoothing process are set. The edge emphasis filter is set so as to emphasize the edges if the value of SUM is small in step S1519. Conversely, the edge emphasis filter is set so as to be relatively weak if the value of SUM is large in step S1519. The smoothing filter is present because there is a possibility that an image could result in which the grain of the film is apparent, even if the value of SUM is extremely large in step S1519. Hence, in this case, the smoothing filter is set so as to make the image more smooth. Conversely, if the value of SUM is small in step S1519, the smoothing filter is not activated to make the image more smooth.

The smoothing process is conducted as described hereinafter. The average value is calculated for the levels of the pixel in which the smoothing process is set and the surrounding pixels. This average value is set as the level of that pixel. This process is conducted on all such pixels.

If it is desired to make the image more smooth, it is preferable when computing the average value of the levels to compute the average value of a larger number of pixels (e.g., the surrounding 24 pixels.) Conversely, if it is not desired to make the image more smooth, it is preferable to find the average value of a smaller number of pixels (e.g., the surrounding 4 pixels.)

The brightness adjustment is set on the basis of the histogram of the image signal levels. When it is determined that the signal levels are high as a whole, the setting is toward the dark side. Conversely, when it is determined that the signal levels are low as a whole, the setting is toward the bright side.

Next, in step S1521, a lookup table (hereinafter called "LUT") is selected for the image process from the histogram of the signal levels, information indicating the type of film, and color temperature information. In addition, the LUT is set so that the highest level out of the maximum signal levels of the various colors RGB is the maximum value of the input range of A/D conversion. In addition, the LUT is set so that the lowest level out of the minimum signal levels of the various colors RGB is the minimum value of the input range of A/D conversion. In addition, when the contrast is set by the user, the LUT is set on the basis of the user setting. In addition, when no setting of the trimming range is made by the user, the trimming range is set from the photograph size information.

Next, the microcomputer advances to step S1522, drives magnetic recording and retrieval circuit 25, and uses magnetic head 25b to write on magnetic recording part 54 the contents of the settings in steps S1518, S1520 and S1521. In addition, magnetic head 25b records on magnetic recording part 54 that thumbnail display has been completed.

Next, in step S1523, the determination is made as to whether or not the frame for which acceptance has been completed is the final frame of film 52. When the determination is YES in step S1523, the process is concluded. When the determination is NO in step S1523, the microcomputer returns to step S1508 and repeats the above-described processes.

Because motor driving in step S1508 is set at a faster speed than motor driving in step S1513, shortening of the time interval needed for reading thumbnail displays can be realized.

In the above-described embodiment, the display of recorded information was made below the thumbnail display, but this may also be effected above the thumbnail display or to the side thereof. In addition, it would also be acceptable to provide a separate display unit on monitor 41 and to collect and display the thumbnail displays on such.

Next, scanning of designated frames will be described with reference to the flowcharts in FIGS. 16 and 17.

The user selects the scanning mode from a menu on monitor 41 using operation unit 42 when thumbnail displays are conducted on monitor 41. Furthermore, the user selects the frame designation mode from a submenu. When this occurs, computer 40 waits in the frame designation state. The user can then select several images for scanning by clicking the mouse on the thumbnail displays displayed on monitor 41.

Figure 22:
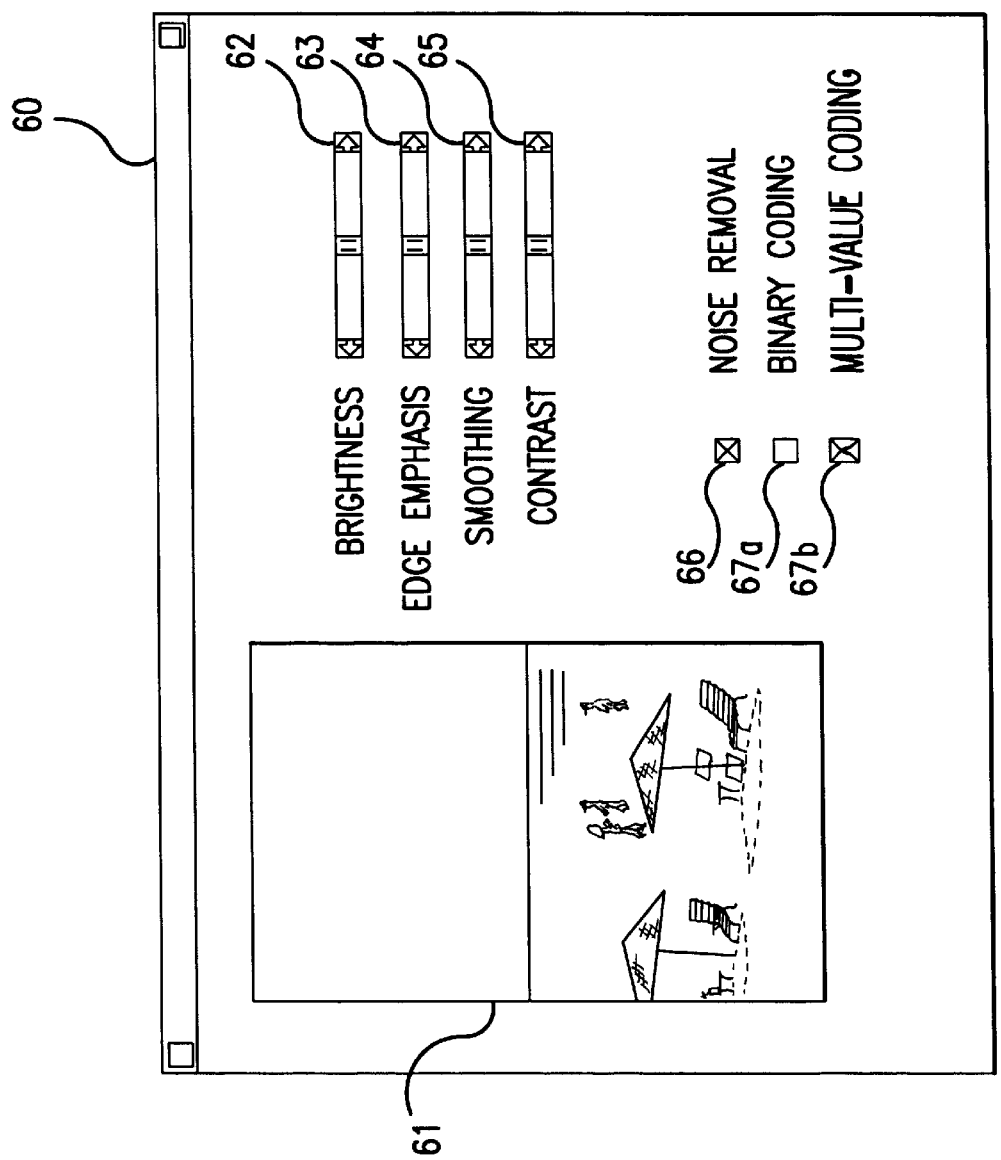
FIG. 22 is a drawing showing the image adjustment menu.

In addition, when the user again clicks the mouse on the thumbnail displays of the images designated for scanning, image adjustment menu 60 is displayed on monitor 41, as shown in FIG. 22. From image adjustment menu 60, it is possible to select above-described contrast correction, edge emphasis, smoothing, and brightness adjustment, in addition to turning a noise removal filter ON or OFF, and selecting binary coding or multi-value coding of the image.

The noise removal filter conducts a process that causes noise in the image to diminish.

The image adjustment menu 60 displays the prescanned image 61. When the user selects adjustment of edge emphasis, the adjustment can be made by moving the bar in edge emphasis selection part 63 with the mouse. Edges are emphasized if the bar is moved to the right, while edge emphasis becomes weaker if the bar is moved to the left. Accompanying movement of the bar in edge emphasis selection part 63, computer 40 causes the image in prescanned image 61 to change. Hence, it is possible for the user to set with ease the desired edge emphasis.

The user can also set the brightness, smoothing and contrast by the same method. Setting of the brightness is conducted using brightness selection part 62. Setting of smoothing is conducted using smoothing selection part 64. Setting of contrast is conducted using contrast setting part 65.

The noise removal filter is a filter used to eliminate noise in the image. When the user wants to apply the noise removal filter to an image, the user clicks the mouse of noise removal filter setting part 66, and an "x" is displayed. In order to cancel the setting, the mouse is again clicked, and the "x" display is erased.

It is also possible for the user to select whether to accept the image with binary coding or to accept the image with multi-value coding. When the user selects binary coding, the user clicks the mouse on binary coding selection part 67a so that an "x" is displayed. When the user selects multi-value coding, the user clicks the mouse on multi-value coding selection part 67b so that an "x" is displayed. When one of either binary coding selection part 67a or multi-value coding selection part 67b is selected, selection of the other is automatically released.

When settings are made at image adjustment menu 60, the contents of the settings are reflected in prescanned image 61. Hence, the user can set with ease the desired image.

Figure 16:
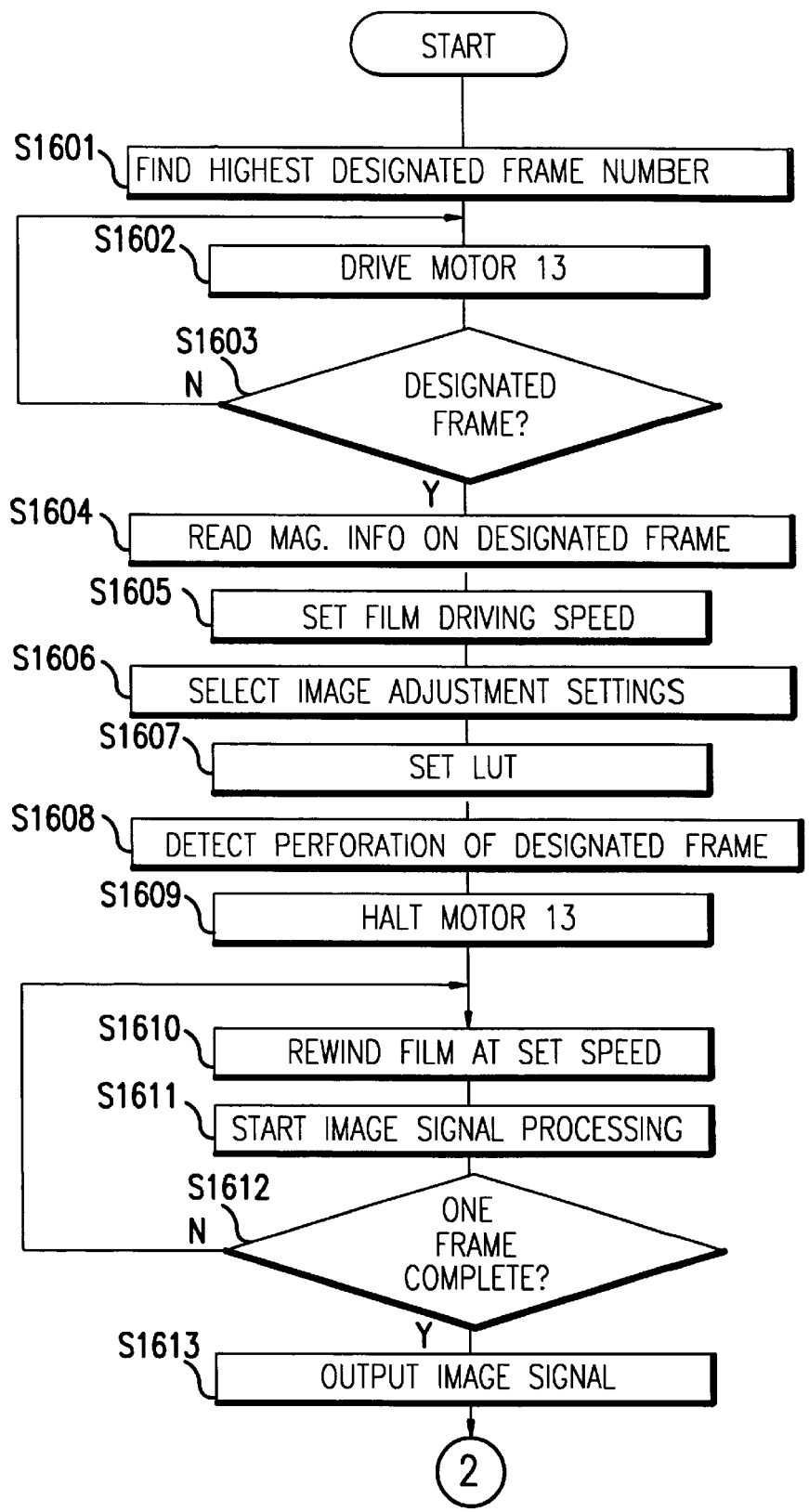
FIG. 16 is a flowchart illustrating a control of the device according to an embodiment of the present invention.

Furthermore, after the user has completed image adjustment settings and scanning image selection, the flowchart in FIG. 16 is started when execution of scanning is commanded.

In step S1601, the verification is made as to which of the frame numbers designated by the user is the largest.

Next, in step S1602, a drive signal is output to motor drive circuit 12 and motor 13 is driven in the direction of rewinding. The drive power of motor 13 is transferred to spool 51b by transfer mechanism 14. Furthermore, film 52 is rewound around cartridge 51. At this time, the connection between motor 19 and winding-side spool 16 is broken by transfer mechanism 20.

In step S1603, magnetic head 25b reads magnetic recording part 54, and the determination is made as to whether the frame is a designated frame. If the determination is NO, the microcomputer returns to step S1602 and driving of motor 13 is continued. If the determination in step S1603 is YES, the microcomputer advances to step S1604.

Figure 15:
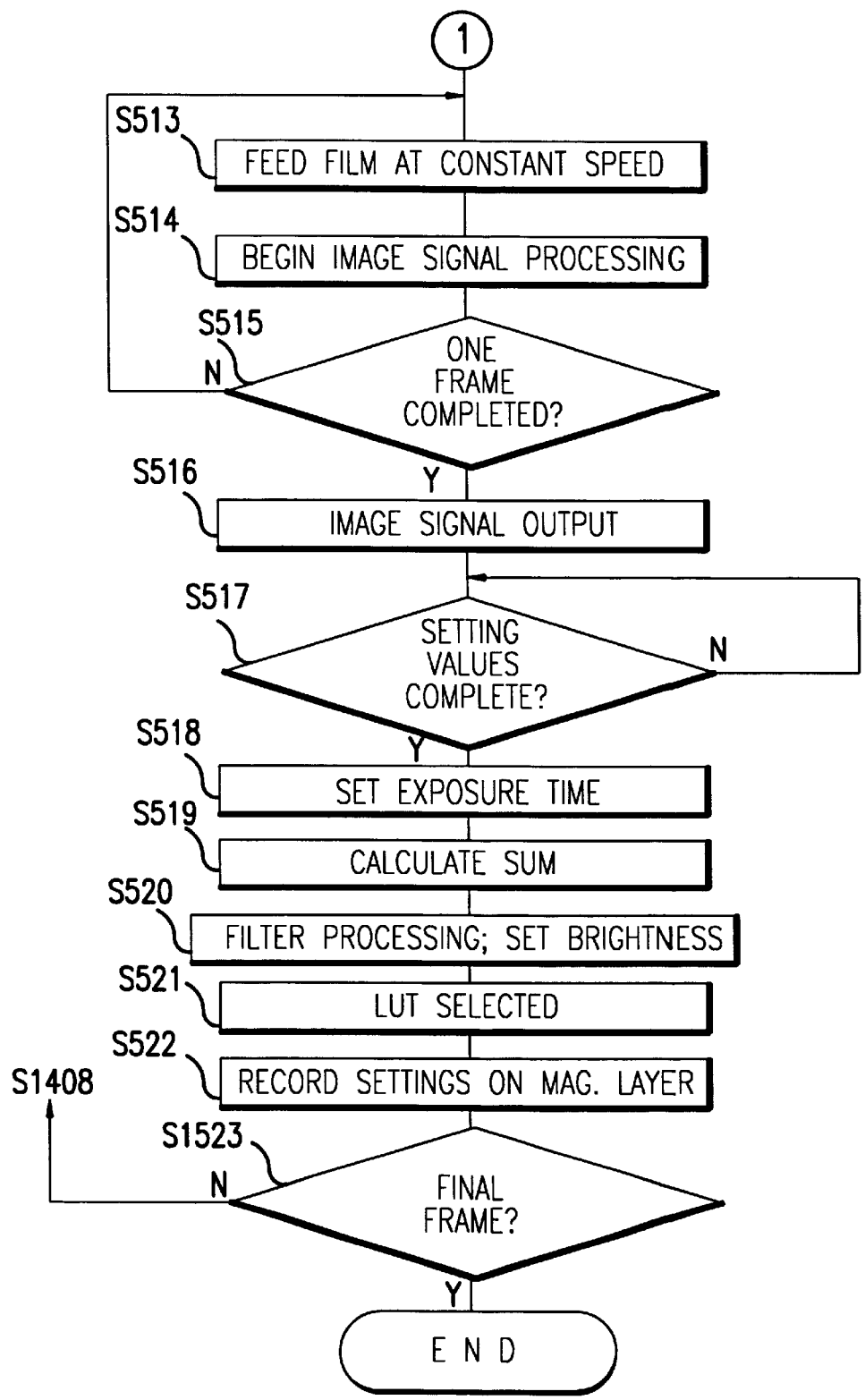
FIG. 15 is a flowchart illustrating a control of the device according to an embodiment of the present invention.

In step S1604, magnetic head 25b reads the recorded information on magnetic recording part 54. The recorded information read at this time includes the frame number, image direction information, photograph size information, color temperature information and information on the contents set in steps S1518, S1520 and S1521 (FIG. 15).

Next, in step S1605, the film drive speed for scanning is set on the basis of the exposure time information read in step S1604.

Next, in step S1606, each image adjustment is set on the basis of the information read in step S1604. However, with regard to the items set by the user at image adjustment menu 60, the settings made by the user are given priority.

Next, in step S1607, the LUT selected in step S1521 is set. However, when the user has made gradation corrections at image adjustment menu 60, the LUT is altered according to the settings made by the user.

Next, when perforation detectors 17c and 17d detect perforation 53 in step S1608, a halt signal is output to motor drive circuit 12 in step S1609. Accordingly, driving of motor 13 is halted, and rewinding of the film is thus halted. At this time, the tip of the film image is controlled so as to be on optical axis 15.

Next, a drive signal is output to motor drive circuit 12 in step S1610, and rewinding of film 52 is commenced at the speed set in step S1605. Furthermore, in step S1611 the linear image sensor is driven so that the image is read, and the image processes set by the LUT and the image processes set at image adjustment menu 60 are performed by image signal processing circuit 22. Furthermore, the processed image signal is stored in frame memory 3.

Then, the processes in steps S1610 and S1611 are repeated until it is determined in step S1612 that acceptance of the image of one frame has been completed.

When the determination in step S1612 is YES, the microcomputer moves to step S1613, and the image signal is output from frame memory 3 to computer 40. In addition, besides the image signal, the maximum signal level of each color RGB within the photo frame, the minimum signal level, and a histogram of the signal levels are also output in step S1613.

Computer 40 displays images on monitor 41 in response to the inputting of image signals. When this display is made, the recorded information concerning the frame number and the like which is read from magnetic recording part 54 is displayed below the image display. From the information read from magnetic recording part 54, the display is made so as to switch vertical and horizontal in the case of a vertical position photograph. However, when image orientation information has been input in step S1517 (FIG. 15), the image orientation information is given priority over the image direction information.

From the photograph size information or the trimming range set by the user in step S1517 (FIG. 15), the image is displayed with only the necessary portions of the film image trimmed.

In addition, computer 40 outputs to recording device 44 the image signal sent, and records such on the recording medium.

Next, the microcomputer advances to step S1714 (FIG. 17), where magnetic head 25a records on magnetic recording part 54 the fact that scanning has been conducted and the fact that settings have been made by the user at image adjustment menu 60.

Next, in step S1715, the determination is made as to whether the image accepted immediately before is the last designated frame. When the determination is NO, the microcomputer returns to step S1601 (FIG. 16) and repeats the above-described processes. When the determination in step S1715 is YES, the microcomputer moves to step S1716. In step S1716, a drive signal is output to motor drive circuit 12, and motor 13 is driven in the direction of rewinding film 52 into film cartridge 51. Furthermore, driving of motor 13 is continued until perforation 53b of the first frame is detected by perforation detector 17a in step S1717.

When perforation 53b of the first frame is detected in step S1717, the microcomputer moves to step S1718. In step S1718, a signal is output to motor drive circuit 12, causing motor 13 to be decelerated. Next, in step S1719, magnetic head 25a is controlled so as to record the above-described ID number on the "0" frame of magnetic recording part 54. Through recording the ID number, the user can determine that thumbnail acceptance has been accomplished, by reading the ID number.

Next, in step S1720, the ID number is output to computer 40. Computer 40 records the ID number received onto a recording medium using recording device 44. Furthermore, when rewinding is determined to be completed in step S1721, the process concludes.

In addition, in the above-described embodiment, operation unit 42 was taken to be attached to computer 40, but a configuration may also be used wherein the operation unit 42 is attached directly to microcomputer 2.

In addition, in the above embodiment, the image to be scanned was selected using a mouse, but it would also be acceptable for this selection to be accomplished by inputting the frame number using the keyboard.

In FIGS. 14–17, prescanning is conducted by feeding film 52, while scanning is conducted while rewinding the film following the completion of prescanning. However, it would also be acceptable to pre-wind film 52 once, and to then conduct prescanning while rewinding film 52 and to conduct scanning while winding the film following the completion of prescanning.

With FIGS. 14–17, prescanning and scanning are completed only by a single winding and rewinding of the film in frame number order (ascending or descending order of frame numbers), and therefore reading of the images can be efficiently achieved in a short period of time.

With the device of FIGS. 14–17, film is fed while verifying the frame number information from magnetic recording part 54. Consequently, it is possible to feed the film with accuracy to the designated frame.

With FIGS. 14–17, it is possible for the user to select images for scanning while viewing the thumbnail displays. Consequently, when a plurality of images are present, it is possible for the selection to be made without verifying each frame one at a time, and consequently, little time is required for selecting images for scanning.

In addition, information set at image adjustment menu 60 and image adjustment information set by scanner 100 are recorded on magnetic recording part 54. Alternatively, it would also be acceptable to record the image adjustment information on memory device 44, and to record on magnetic recording part 54 only the frame number corresponding to the ID number of the film and image adjustment information. Furthermore, it would also be acceptable at the time of scanning to read from magnetic recording part 54 the ID number and frame number, and to conduct image adjustment on the basis of the corresponding image adjustment information on recording device 44. When this is done, it is possible to record adequate amounts of information even when the capacity of magnetic recording part 54 of the film is small and the size of the image adjustment information is large.

Next, scanning in a designated frame order is described with reference to the flowcharts in FIGS. 18–20.

The user selects the scanning mode from a menu on monitor 41 using operation unit 42 when thumbnail displays are conducted on monitor 41. Furthermore, the user selects the frame order designation mode from a submenu. When this occurs, computer 40 waits in the frame order designation state. The user can then select several images for scanning by clicking the mouse on the thumbnail displays displayed on monitor 41. The frame numbers are then displayed on monitor 41 in the designated order.

Figure 17:
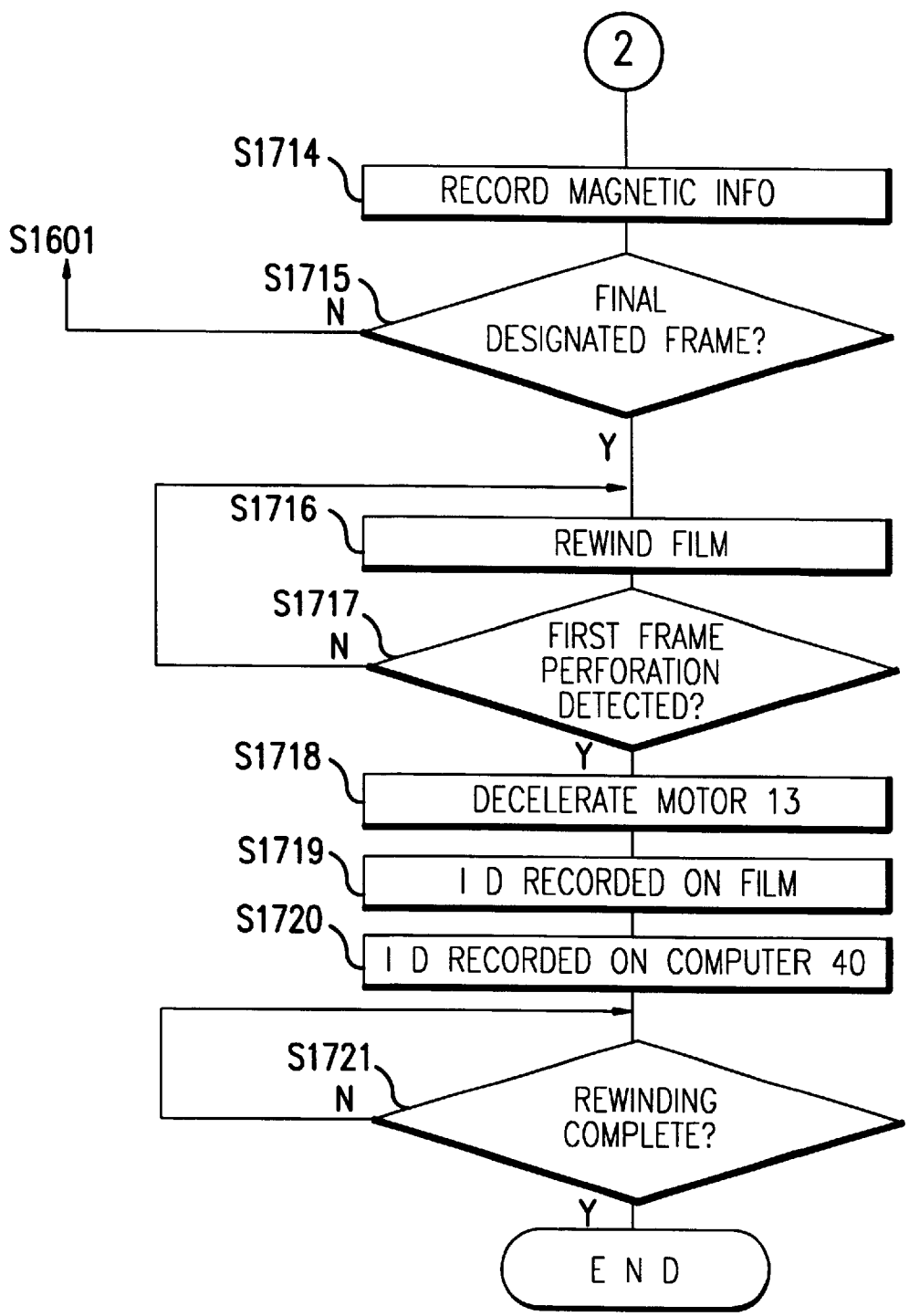
FIG. 17 is a flowchart illustrating a control of the device according to an embodiment of the present invention.

In addition, it is possible for the user to set image adjustment at image adjustment menu 60 in the designated frame order the same as with scanning in FIGS. 16 and 17.

Figure 18:
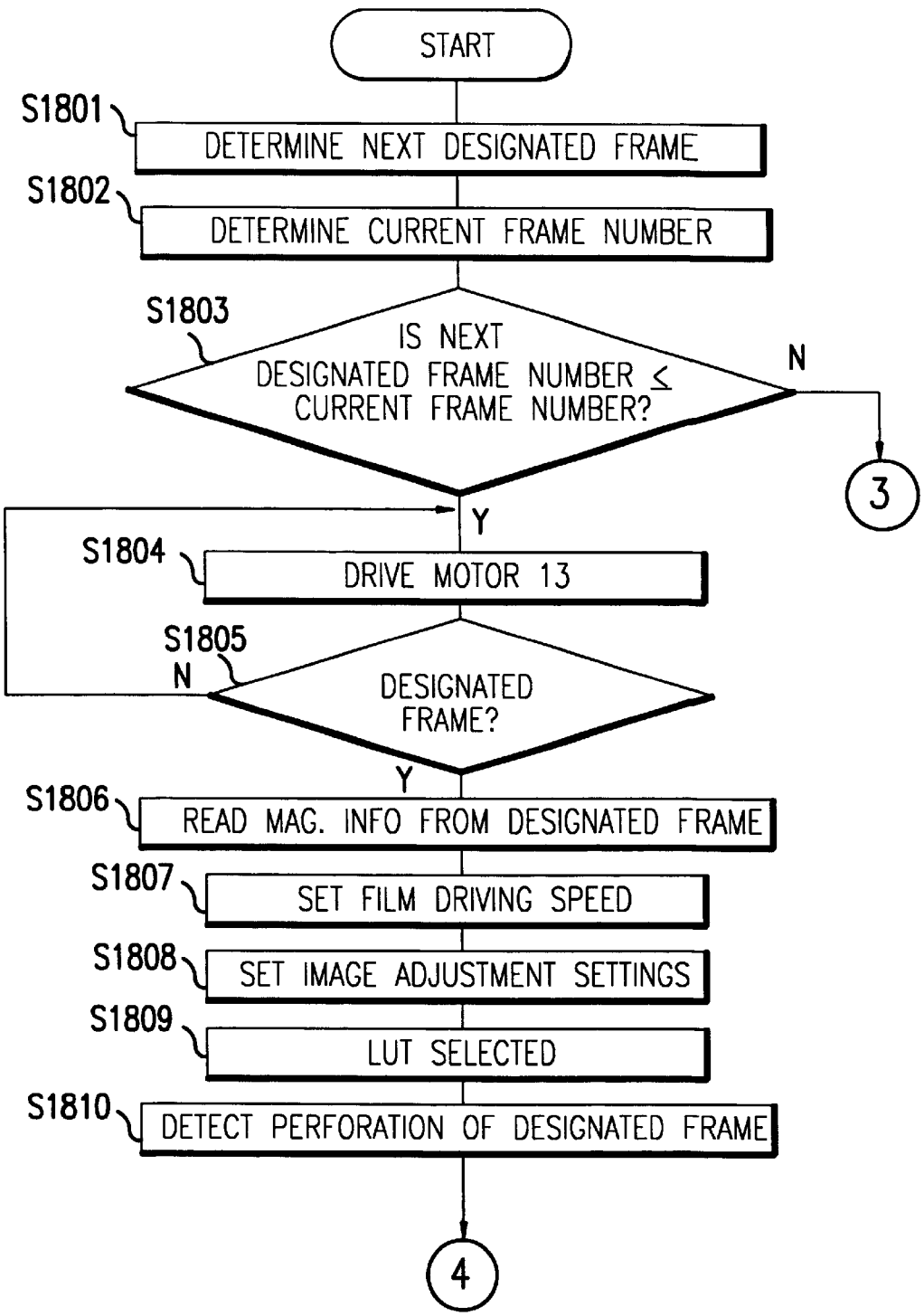
FIG. 18 is a flowchart illustrating a control of the device according to an embodiment of the present invention.
Figure 19:
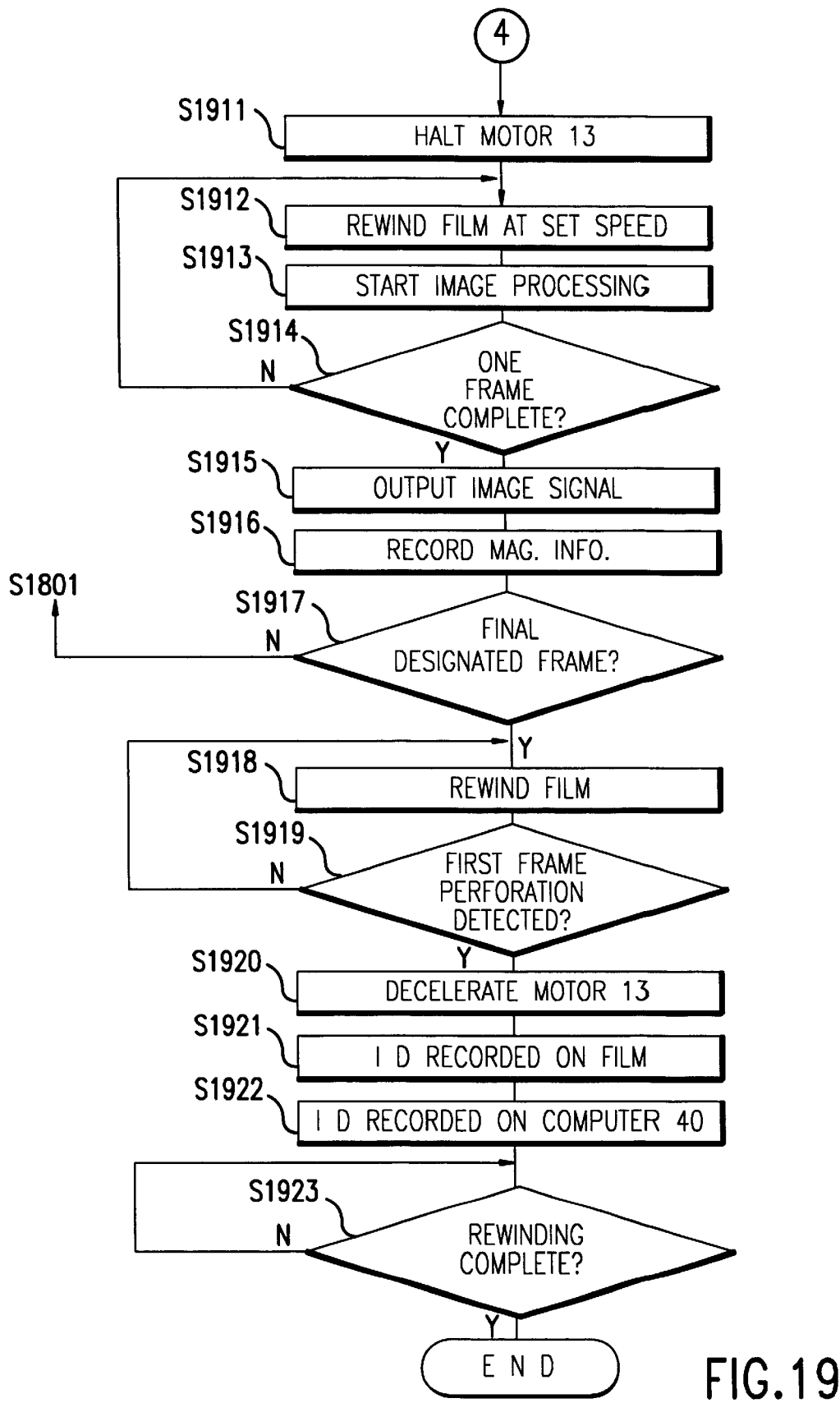
FIG. 19 is a flowchart illustrating a control of the device according to an embodiment of the present invention.

Furthermore, after the user has completed the image adjustment settings and scanning image selection, the flowchart in FIG. 18 is started when execution of scanning is commanded.

In step S1801, the determination is made as to what frame number is the next frame number designated, out of those frame numbers designated by the user. Next, in step S1802, the detection is made as to what frame number is currently positioned with the image on optical axis 15.

Next, in step S1803, the determination is made as to whether the next designated frame number determined in step S1801 is less than the current frame number detected in step S1802. When the determination in step S1803 is YES, the microcomputer moves to step S1804.

The steps from S1804 to S1916 (FIG. 19) are the same as the steps from S1602 to S1714 in FIGS. 16 and 17, so explanation of such is omitted here.

Figure 20:
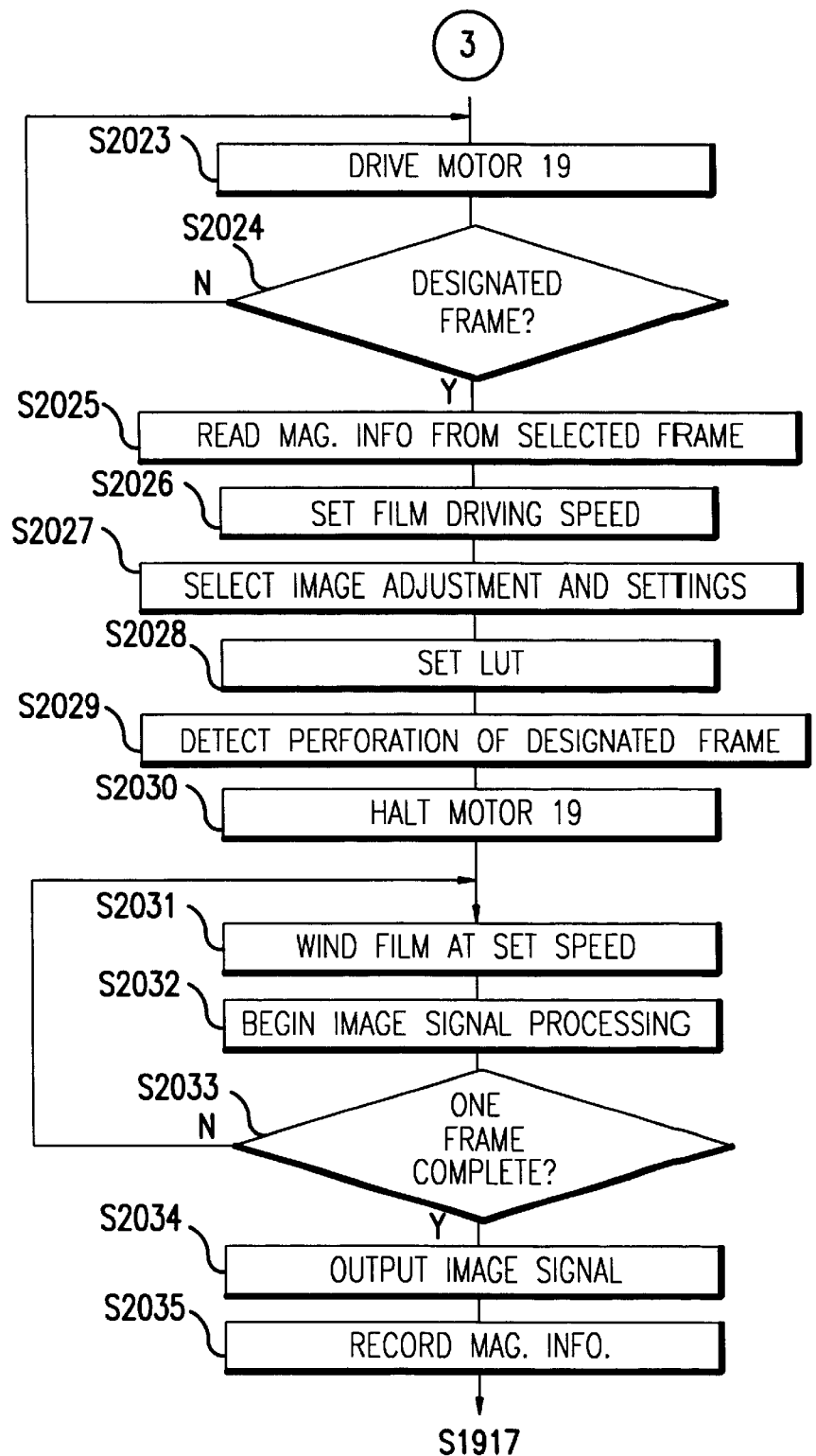
FIG. 20 is a flowchart illustrating a control of the device according to an embodiment of the present invention.

When the determination in step S1803 is NO, the microcomputer moves to step S2023 in FIG. 20.

In step S2023, a drive signal is output to motor drive circuit 18, and motor 19 is driven in the direction of winding. At this time, the connection between motor 13 and spool 51b is broken by transfer mechanism 14.

In step S2024, magnetic head 25a reads magnetic recording part 54, and the determination is made as to whether the frame is the designated frame. When this determination is NO, the microcomputer returns to step S2023 and continues driving of motor 19. When the determination in step S2024 is YES, the microcomputer advances to step S2025.

The processes from step S2025 to S2028 are the same as the processes from step S1604 to S1607 in FIG. 16, so explanation of such is omitted here.

Next, when perforation detectors 17a and 17b detect perforation 53 in step S2029, a halt signal is output to motor driving circuit 18 in step S2030. Accordingly, driving of motor 19 is halted, and feeding of the film is also halted. At this time, the tip of the film image is positioned on optical axis 15.

Next, in step S2031, a drive signal is output to motor drive circuit 18, and film 52 is fed at the speed set in step S2026. Furthermore, linear image sensor 21 is driven in step S2032 and accepts the image, which undergoes the image processing in image signal processing circuit 22 set by the LUT and the image processing set at image adjustment menu 60. The processed image signal is stored in frame memory 3.

The actions in steps S2031 and S2032 are repeated until it is verified in step S2033 that acceptance of the image of one frame has been completed. When the determination in step S2033 is YES, the microcomputer advances to step S2034.

The processes in steps S2034 and S2035 are the same as the processes in steps S1613 and S1614 of FIG. 16, so explanation of such is omitted here. When the process in step S2035 is completed, the microcomputer moves to step S1917 (FIG. 19).

In step S1917, the determination is made as to whether or not the image accepted immediately before is the last designated frame. When the determination is NO, the microcomputer returns to step S1801 (FIG. 18) and repeats the above-described processes. When the determination in step S1917 is YES, the microcomputer moves to step S1918.

The steps from step S1918 to the END are the same as the processes from step S1716 to the END in FIG. 17, so explanation of such is omitted here.

Being able to accept images in a designated frame order is beneficial because it allows the images with the highest priority to the user to be accepted first. In particular, this is beneficial because it is possible to select only necessary images and accept such when the recording medium is one having a small capacity, such as a floppy disk or the like.

In the above-described embodiments, the position of film 52 is determined by perforation detectors 17a, 17b, 17c and 17d detecting perforations 53. Instead of this arrangement, it would also be acceptable to determine the position by feeding the film by a preset amount after the frame number recorded on magnetic recording part 54 is detected by magnetic head 25.

In addition, with the above-described embodiments, the image adjustment settings of scanner 100 and the LUT settings and the like are recorded on magnetic recording part 54 of film 52. Consequently, when the image is read again by the same scanner, it is not necessary to make the same settings. Hence, it is not necessary for the user to spend time making settings. In addition, when the image is scanned by a different scanner, it is possible for an LUT to be set from the image information such as the histogram of signal levels and the like recorded at the time of prescanning, so that it is not necessary to prescan the film. Hence, the benefit results that it is not necessary for the user to spend time making settings.

In addition, there is a concern that when setting information or the like is temporarily stored on an HDD, the setting information or the like could be erroneously erased from the HDD. However, with the above embodiments, image information and the like, including setting information and a histogram of signal levels, is recorded on the film, so the risk of erroneously erasing this information is diminished.

When information adjustment settings made by the scanner and settings made by the user have already been recorded on magnetic recording part 54, it would also be acceptable to select either settings as the conditions for scanning, the selection made using operation unit 42. When this is done, it is possible for the user to selected either of the settings when scanning is conducted later. Hence, it is possible for scanning to be conducted promptly with the user merely selecting the settings.

The system according to the present invention is such that feeding of the film is controlled on the basis of the detection of frame numbers recorded on the film, the detection effected by the detection means. Consequently, it is possible to feed the film accurately to a designated frame and read the image thereon.

Figure 23:
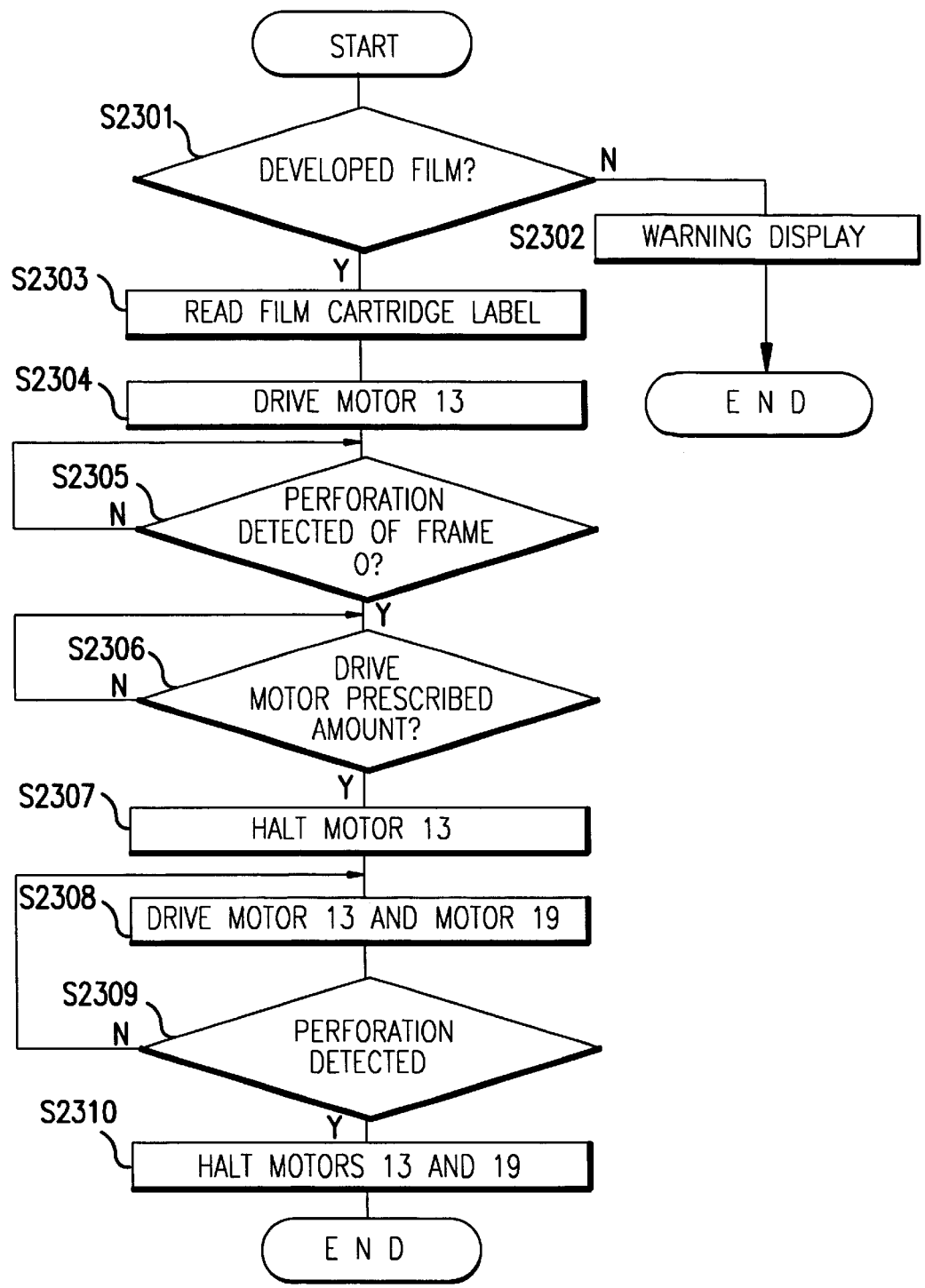
FIG. 23 is a flowchart for film settings in the present embodiment.

A start mode for film setting is described below with reference to the flowchart in FIG. 23, which is useable with any of the prescanning and or scanning embodiments described herein.

In step S2301, the determination is made, on the basis of detection performed by detector 11a, as to whether a developed film cartridge 51 has been loaded in cartridge loading chamber 1a. When this determination is NO, the microcomputer moves to step S2302, and warns computer 40 if film cartridge 51 has not been loaded or if film 52 is undeveloped. Computer 40 performs a warning display on monitor 41 in accordance with the warning received. It would also be acceptable to provide a display device on scanner 100 and to perform the warning on this display device. By determining whether a developed film cartridge is loaded, it is possible to prevent undeveloped film from being extracted from cartridge 51 erroneously.

When the determination in step S2301 is YES, the microcomputer moves to step S2303. In step S2303, the type of film 52, the name of the manufacturer, and whether the film is color or black and white is detected by detector 11a.

Next, in step S2304, a drive signal is output to motor drive circuit 12, and motor 13 is driven. The drive power of motor 13 is transferred to spool 51b via transfer mechanism 14. Furthermore, the tip of film 52 is fed out from film exit opening 51a in the body of the cartridge.

Next, in step S2305, the microcomputer waits for perforation detector 17a to detect perforation 53 of frame "0." When perforation 53 is detected in step S2305, motor 13 is driven by a specific amount in step S2306, and motor 13 is then halted in step S2307. When motor 13 is halted, motor 13 has been driven by a specific amount in step S2306 so that film 52 reaches winding-side spool 16.

Next, in step S2308, drive signals are output to motor drive circuit 12 and motor drive circuit 18, so that motor 13 is driven in the direction of feeding while motor 19 is driven in the direction of winding.

Next, in step S2309, the determination is made as to whether perforation detection unit 17a has detected the next perforation 53. When perforation 53 has not been detected, driving of motor 13 and motor 19 is continued. When the next perforation 53 has been detected, a halt signal is output to motor drive circuit 12 and motor drive circuit 18, causing driving of motor 13 and motor 19 to be halted (step S2310).

Figure 24:
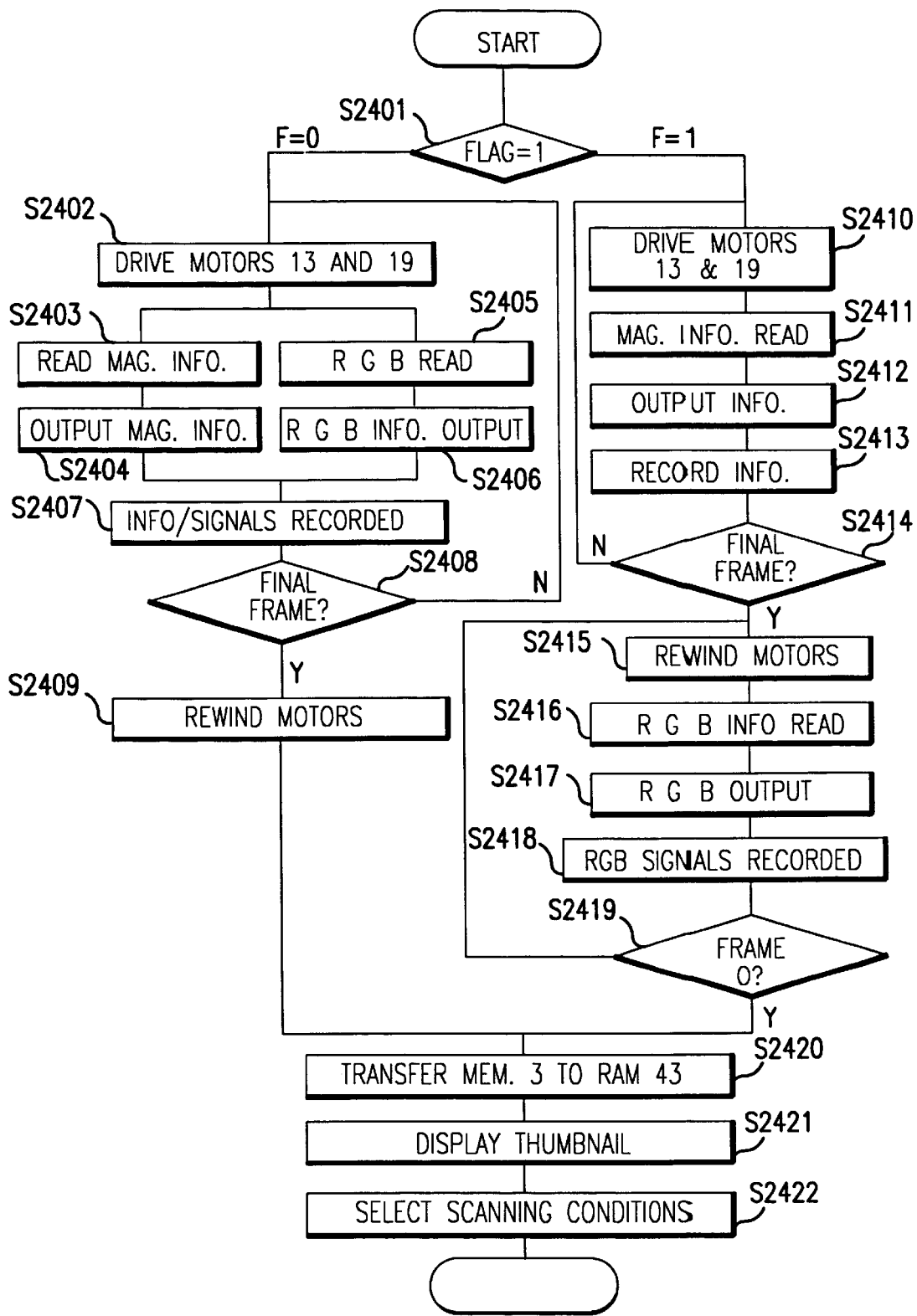
FIG. 24 is a flowchart for pre-scanning in the present embodiment.

Once the film has been set, the user can select the prescanning process shown in FIG. 24.

In step S2401, the determination is made as to whether a mode (flag=0) is set wherein magnetic information and RGB image information are read simultaneous with the feeding of the film, or whether a mode (flag=1) is set wherein the magnetic information is read first and then the RGB information is read when the film is rewound. If flag=0, the microcomputer moves to step S2402, while if flag=1, the microcomputer moves to step S2410.

When flag=0, in step S2402 motor 13 and motor 19 rotate in a clockwise direction, and film in cartridge 51 is fed at a constant speed. While the film is being supplied at this constant speed, magnetic information is read or written by magnetic heads 25a and 25b (S2403). In addition, RGB image information is read by one-dimensional CCD 21 (S2405). Because it is sufficient to obtain an image for film density and color correction, it is not necessary to obtain exactly three image signals in RGB for each line by halting film feeding at each line.

Furthermore, in step S2404, magnetic information written on the film is output, and in addition, in step S2406, film images are output from the one-dimensional CCD. In step S2407, the magnetic information and the image information is stored in frame memory 3. The recorded information read at this time includes the frame number, the date and time of photography, image direction information, photograph size information and color temperature information and the like. Image direction information is information indicating whether the image is an image from vertical position photography or an image from horizontal position photography. Photograph size information is information indicating what size the photograph image is, such as normal size, panorama size, hi-vision size or half size, and is also information indicating what portions of the photograph image are to be trimmed.

In step S2408, the determination is made as to whether film 52 has been fed as far as the final frame. When the determination is that the film has not been fed as far as the final frame, the microcomputer returns to step S2402 and driving of the motors is conducted and magnetic information and image signals are accepted until the final frame is reached. When the determination is that the film has been fed as far as the final frame, the microcomputer moves to step S2409. In step S2409, rewinding of the film is conducted using the motors in preparation for scanning, and the microcomputer then moves to step S2420.

On the other hand, when flag=1, in step S2410 motor 13 and motor 19 rotate in a clockwise direction so that the film in cartridge 51 is fed at high speed. While the film is being fed at this constant high speed, magnetic information is read by magnetic heads 25a and 25b (step S2411), the information is output (S2412) and the information is recorded (S2413). Because only magnetic information is read, the image on each frame can be read at a higher speed than in the case described above when image information is coarsely read. Similar to the case described above, the recorded information read at this time includes the frame number, photograph date and time, image direction information, photograph size information and color temperature information. Image direction information is information indicating whether the image is an image from vertical position photography or an image from horizontal position photography. Photograph size information is information indicating what size the photograph image is, such as normal size, panorama size, hi-vision size or half size, and is also information indicating what portions of the photograph image are to be trimmed.

In step S2414, the determination is made as to whether the film has been read as far as the final frame. When reading has not been conducted up through the final frame, the microcomputer returns to step S2410, and the magnetic information of the next frame is read. When reading has been conducted up through the final frame, the microcomputer moves to step S2415. The determination as to whether reading has been conducted up through the final frame is made on the basis of signals from above-described perforation detectors 17a and 17b.

In step S2415, the film is rewound at slow speed. While the film is being fed at this constant slow speed, one-dimensional CCD 21 reads the RGB image information (S2416), image signals are output (S2417) and image signals are recorded (S2418). Because obtaining an image for film density and color correction is sufficient, it is not necessary to obtain exactly three image signals for RGB at each line by halting the film feeding at each line, but an overly rough reading results if the speed is too fast. In step S2419, the determination is made as to whether the film has been read as far as frame "0." When reading has not been conducted up through frame "0," the microcomputer returns to step S2415, and image information on the next frame is read. When it is detected by above-described perforation detectors 17a and 17b that frame "0" has been reached, the film has been rewound. Furthermore, the microcomputer than moves to step S2420 in order to prepare for scanning.

In step S2420, the image signals and the like stored in frame memory 3 are transferred to RAM 43 in computer 40 via an SCSI interface.

In step S2421, image signals from frame memory 3 in scanner 100 are input into computer 40 and thumbnail images are displayed on monitor 41. When this display is made, the recorded information such as frame number or the like read from the magnetic recording layer are displayed below the thumbnail displays, as described above.

In addition, computer 40 outputs to recording device 44 the recorded information that has been sent, thereby recording the information on a recording medium. Because the image signals are images that have been quickly read and the amount of information is therefore small, this information can be recorded rapidly.

In step S2422, settings for the accumulation time of RGB for shading correction and color correction at each frame, and settings of the amount of illuminating light and the like are conducted on the basis of the image information that has been coarsely read. Furthermore, the photographer, after verifying the thumbnail displays and magnetic recording information on monitor 41, can indicate the frame numbers for which scanning is desired using keyboard 42, can indicate the reading precision, and can further indicate the reading range. Scanning is started after these condition settings have been completed.

The operation of image signal processing circuit 22 and the display of image information on monitor 41 have been above described with reference to FIG. 9.

Accordingly, it becomes possible to read the film image economically and with high precision.

The picture image reading device of the present invention is a device that reads images on film having a magnetic recording section, the film being wound and stored inside a cartridge. Furthermore, the device comprises prescanning and scanning means (S2402–S2406, S2410–S2413 and S2415–S2418 (FIG. 24)); conveyor means (12–13, 18–20) that conveys the film; conveyor control means 2 that controls the conveyor means during prescanning so that the film is conveyed at a constant speed; retrieval means 25 that retrieves the information stored in the magnetic recording section when the film is conveyed at a constant speed by the conveyor control means; and photoelectric conversion means 21 that reads the image information and converts such into electrical signals when the film is conveyed at a constant speed by the conveyor means.

Because the picture image reading device that uses a one-dimensional photoelectric conversion means (CCD line sensor) reads image information precisely during a scanning operation, a single line of film is conveyed and image signals are obtained for R (red), G (green) and B (blue).

Even with a picture image reading device that uses a one-dimensional photoelectric conversion means, it is possible to obtain magnetic recording information and image information while conveying the film at a constant speed during prescanning. By so doing, it is possible to reduce the time needed for prescanning.

In addition, if magnetic recording information and image information are read while the film is conveyed in a first direction, control of the film conveying mechanism is made easy.

In addition, if the magnetic recording information is read while the film is conveyed at a fast speed in a first direction and the image information is read while the film is conveyed at a slow speed in a second direction, it is possible to reduce the time needed for prescanning and it is also possible to obtain a highly precise image because the speed is slower during reading of the image information.

The invention has been described above with reference to preferred embodiments thereof, which are intended to be illustrative, not limiting. Various other modifications may be made without departing from the scope of the invention as defined in the appended claims.

What is claimed is:

1. A method of processing a photographic film having a plurality of frames using an image scanner having an image sensor including performing a prescanning operation of the film at a coarse image resolution to generate prescanned data and subsequently performing a finer resolution scanning operation that uses the prescanned data, comprising:

setting a charge accumulation time of the image sensor for each of a plurality of colors RGB to a reference time $T_0$;

obtaining black and white levels for each frame from signals from the prescanning operation;

determining charge accumulation times $T_1$, $T_2$ and $T_3$ of the image sensor from the black and white levels, for each of the colors RGB for each of the frames; and performing the finer resolution scanning operation with the charge accumulation times $T_1$, $T_2$ and $T_3$.

2. The method according to claim 1, wherein said image sensor is a one-dimensional photoelectric converter.

3. The method according to claim 1, wherein said plurality of frames include an image section and a magnetic section, and said prescanning step includes prescanning the magnetic sections of the film.

4. The method according to claim 3, wherein said prescanning step includes prescanning said image sections and said magnetic sections at a constant speed.

5. The method according to claim 1, further comprising displaying at least one of said prescanned frames as an image from said prescanned data.

6. The method according to claim 5, further comprising simultaneously displaying images from said plurality of frames on a monitor.

7. The method according to claim 3, further comprising orienting an image in a display in accordance with magnetic display information contained in the corresponding magnetic section of the film.

8. The method according to claim 3, further comprising displaying information adjacent an image in a display, said information being contained in the corresponding magnetic section of the film.

9. The method according to claim 5, further comprising selecting at least one frame to be scanned in said subsequent scanning operation on the basis of user input following said displaying step.

10. The method according to claim 9, further comprising writing a magnetic identification number on the magnetic section of said at least one frame selected for scanning.

11. A method according to claim 9, further comprising changing at least one photographic condition of said at least one frame selected for scanning, prior to scanning.

12. An apparatus for processing a photographic film using an image scanner having an image sensor, including means for prescanning said film at a coarse image resolution to generate prescanned data and means for scanning said film at a finer resolution using the prescanned data, comprising:

means for setting a charge accumulation time of the image sensor, for each of a plurality of colors RGB, to a reference time $T_0$;

means for obtaining black and white levels from prescanned data for each frame; and means for determining charge accumulation times $T_1$, $T_2$ and $T_3$ of the image sensor for each of the colors RGB for each frame from the black and white levels for a corresponding image, wherein the means for scanning at a finer resolution scans the image with the charge accumulation times $T_1$, $T_2$ and $T_3$.

13. The apparatus according to claim 12, wherein said image sensor is a one-dimensional photoelectric converter.

14. The apparatus according to claim 12, wherein each of said frames includes an image section and a magnetic section, and said prescanning means includes means for prescanning the magnetic sections of the film.

15. The apparatus according to claim 14, wherein said prescanning means includes means for prescanning said image sections and said magnetic sections at a constant speed.

16. The apparatus according to claim 12, further comprising means for displaying at least one said prescanned frames as an image from said prescanned data.

17. The apparatus according to claim 16, wherein said display means is arranged to simultaneously display images from said plurality of frames on a monitor.

18. The apparatus according to claim 14, wherein said display means is arranged to orient an image in said display in accordance with magnetic display information contained in the corresponding magnetic section of the film.

19. The apparatus according to claim 16, wherein said display means is arranged to display information adjacent to an image in said display, said information being contained in the corresponding magnetic section of the film.

20. The apparatus according to claim 16, further comprising means for selecting at least one frame to be scanned in said subsequent scanning operation on the basis of user input following said image display.

21. The apparatus according to claim 20, further comprising means for writing a magnetic identification number on the magnetic section of said at least one frame selected for scanning.

22. The apparatus according to claim 20, further comprising means for changing at least one photographic condition of said at least one frame selected for scanning, prior to scanning.

* * * * *

UNITED STATES PATENT AND TRADEMARK OFFICE
Certificate

Patent No. 6,317,221 B1                                                                  Patented: November 13, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Toshiya Aikawa, Kanagawa-ken, Japan; Eisaku Maeda, Chiba-ken, Japan; Nobuhiro Fukinawa, Kanagawa-ken, Japan; Nobukazu Ito, Chiba-ken, Japan; and Hideya Nagata, Kanagawa-ken, Japan.

Signed and Sealed this Ninth Day of September 2003.

*KIMBERLY A. WILLIAMS*
*Supervisory Patent Examiner*
*Art Unit 2626*